United States Patent
Shibuya

(10) Patent No.: US 7,847,498 B2
(45) Date of Patent: Dec. 7, 2010

(54) BRUSHLESS MOTOR DRIVING DEVICE, BRUSHLESS MOTOR STARTING METHOD, AND METHOD OF DETECTING ROTOR STOP POSITION OF BRUSHLESS MOTOR

(75) Inventor: Shinji Shibuya, Kiryu (JP)

(73) Assignee: Mitsuba Corporation, Kiryu-Shi (JP)

(*) Notice: Subject to any disclaimer, the term of this patent is extended or adjusted under 35 U.S.C. 154(b) by 502 days.

(21) Appl. No.: 11/881,243

(22) Filed: Jul. 25, 2007

(65) Prior Publication Data

US 2008/0048598 A1 Feb. 28, 2008

(30) Foreign Application Priority Data

| Jul. 28, 2006 | (JP) | ............................. 2006-206390 |
| Sep. 7, 2006 | (JP) | ............................. 2006-242647 |
| Jan. 5, 2007 | (JP) | ............................. 2007-000469 |

(51) Int. Cl.
*H02P 6/00* (2006.01)

(52) U.S. Cl. ............................. 318/400.01; 318/400.03; 318/400.11; 318/400.33

(58) Field of Classification Search ............ 318/400.01, 318/400.03, 400.11, 400.33
See application file for complete search history.

(56) References Cited

U.S. PATENT DOCUMENTS 6,704,261 B2 * 3/2004 Watt et al. ................. 369/47.39

2004/0036436 A1 * 2/2004 Tieu ............................ 318/439

FOREIGN PATENT DOCUMENTS

| JP | 6-25224 | 4/1994 |
| JP | 2001-128485 | 5/2001 |
| JP | 2001-211684 | 8/2001 |
| JP | 2002-335691 | 11/2002 |
| JP | 2004-040943 | 2/2004 |

* cited by examiner

*Primary Examiner*—Walter Benson
*Assistant Examiner*—Erick Glass
(74) *Attorney, Agent, or Firm*—Kenyon & Kenyon LLP

(57) ABSTRACT

When starting a brushless motor, if the stop position of the rotor is detected between time t1 and time t2, a start-up excitation pattern in accordance with the rotor stop position is input for an initial energization time Ts1. Afterward, when the energization is stopped, a plurality of signals SL1, SL2, SL3, SL4 are generated in sequence in excitation switch timing signals in accordance with the rotational position of the coasting rotor. From these signals SL1 to SL4, the rotor position is detected using the second and subsequent signals SL2 to SL4 and then the process shifts to ordinary energization switch control. In accordance with the present invention, it is possible to start up a motor in a short time with a simple method so as to obtain a large torque during start-up.

16 Claims, 19 Drawing Sheets

FIG. 5
1: U⇒V
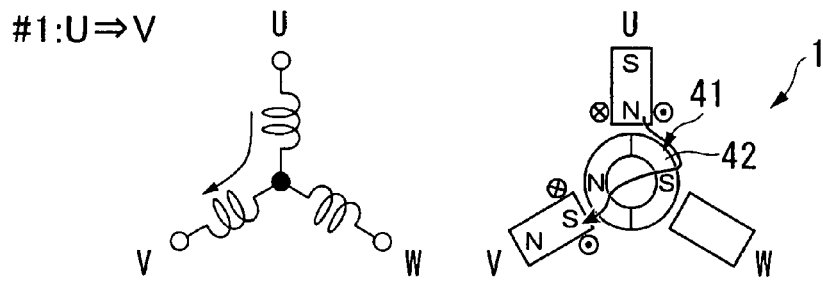
2: U⇒W
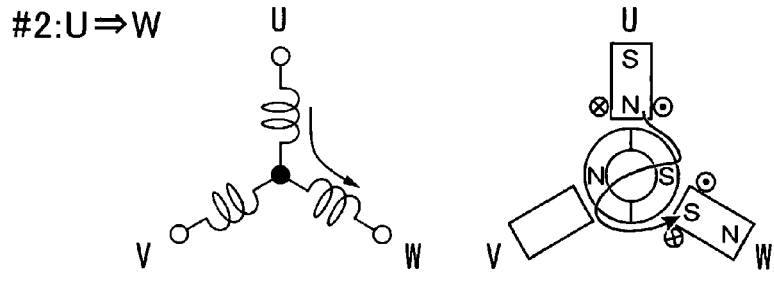
3: V⇒W
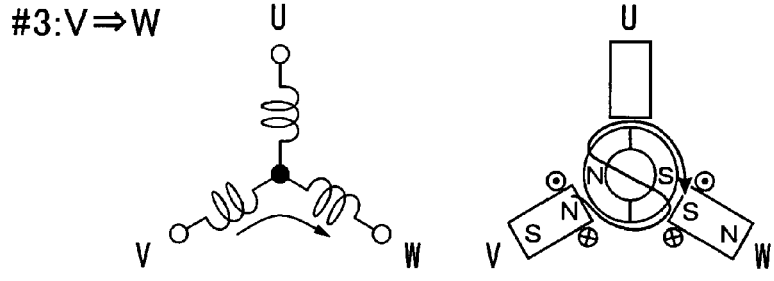
4: V⇒U
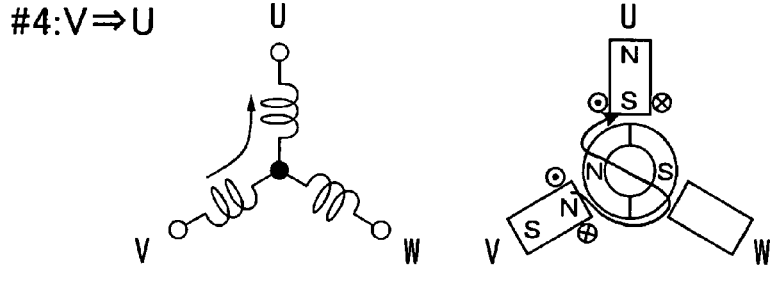
5: W⇒U
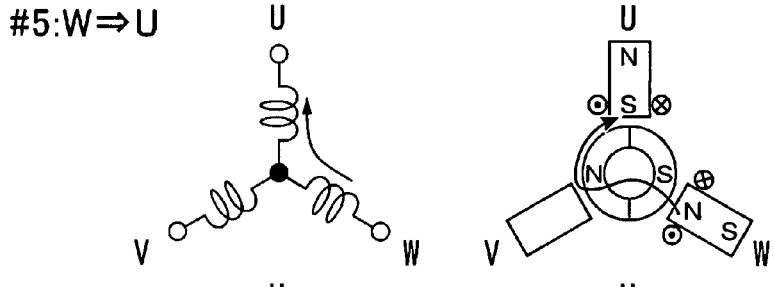
6: W⇒V
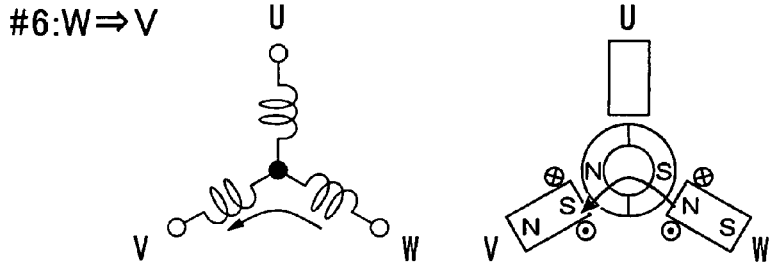

FIG. 18

| STEP | STATE DETECTION LOCATION | EDGE DETECTION | COUNT VALUE OF SPIKE PULSE WIDTH TO BE DETECTED |
|---|---|---|---|
| 0 | U→V ENERGIZATION | - | - |
| 1 | OPEN | FALLING EDGE OF W PHASE | #1 PULSE WIDTH COUNT VALUE |
| 2 | U→V ENERGIZATION | - | - |
| 3 | OPEN | FALLING EDGE OF W PHASE | #1 PULSE WIDTH COUNT VALUE |
| 4 | U→W ENERGIZATION | - | - |
| 5 | OPEN | FALLING EDGE OF V PHASE | #2 PULSE WIDTH COUNT VALUE |
| 6 | U→W ENERGIZATION | - | - |
| 7 | OPEN | FALLING EDGE OF V PHASE | #2 PULSE WIDTH COUNT VALUE |
| 8 | V→W ENERGIZATION | - | - |
| 9 | OPEN | FALLING EDGE OF U PHASE | #3 PULSE WIDTH COUNT VALUE |
| 10 | V→W ENERGIZATION | - | - |
| 11 | OPEN | FALLING EDGE OF U PHASE | #3 PULSE WIDTH COUNT VALUE |
| 12 | V→U ENERGIZATION | - | - |
| 13 | OPEN | FALLING EDGE OF W PHASE | #4 PULSE WIDTH COUNT VALUE |
| 14 | V→U ENERGIZATION | - | - |
| 15 | OPEN | FALLING EDGE OF W PHASE | #4 PULSE WIDTH COUNT VALUE |
| 16 | W→U ENERGIZATION | - | - |
| 17 | OPEN | FALLING EDGE OF V PHASE | #5 PULSE WIDTH COUNT VALUE |
| 18 | W→U ENERGIZATION | - | - |
| 19 | OPEN | FALLING EDGE OF V PHASE | #5 PULSE WIDTH COUNT VALUE |
| 20 | W→V ENERGIZATION | - | - |
| 21 | OPEN | FALLING EDGE OF U PHASE | #6 PULSE WIDTH COUNT VALUE |
| 22 | W→V ENERGIZATION | - | - |
| 23 | OPEN | FALLING EDGE OF U PHASE | #6 PULSE WIDTH COUNT VALUE |
| 24 | STOP POSITION ESTIMATION | - | - |

BRUSHLESS MOTOR DRIVING DEVICE, BRUSHLESS MOTOR STARTING METHOD, AND METHOD OF DETECTING ROTOR STOP POSITION OF BRUSHLESS MOTOR

BACKGROUND OF THE INVENTION

1. Field of the Invention

The present invention relates to a brushless motor driving device, a brushless motor starting method, and a method of detecting the rotor stop position of a brushless motor.

Priority is claimed on Japanese Patent Application No. 2006-206390, filed Jul. 28, 2006, Japanese Patent Application No. 2006-242647, filed Sep. 7, 2006, and Japanese Patent Application No. 2007-000469, filed Jan. 5, 2007, the content of which is incorporated herein by reference.

2. Description of Related Art

In a brushless motor of the type in which the rotor has a permanent magnet, position sensorless drive control may be performed in which position sensors that detect the rotational position of the rotor are not provided. In this case, the rotational position of the rotor is detected from the edge gap of a pulse signal obtained by inputting an induced voltage that appears at the motor terminals of an open section (non-energized phase) and an equivalent neutral-point potential to a comparator. However, when the rotational frequency is zero or the rotational frequency is extremely low, such as during startup of a brushless motor, since the induced voltage is not generated or is extremely small, a signal sufficient for detection of the rotational position is not acquired.

A conventional method for detecting the stop position of a rotor includes detecting the voltage impressed on coils of three phases and detecting the inductances of the coils from the differences in voltage rise times to determine the coils facing magnetic poles of permanent magnets (for example, refer to Japanese Unexamined Patent Application, First Publication No. 2004-40943). In the event of the flux direction of the coil and the flux direction of the magnet core not coinciding, when a current is flowed, the impedance changes before and after the flow of the current due to residual magnetization of the magnet core. Therefore, in the driving device that is disclosed in Japanese Unexamined Patent Application, First Publication No. 2004-40943, a current is flowed in succession two times or more in the same phase and the coil with the smallest voltage rise time in the second time onward is detected.

As another method of detecting the rotor stop position, three-phase conduction is performed by simultaneously flowing short pulse currents, a degree of which does not rotate the rotor, from one coil to the two other coils. By measuring the pulse width of square-wave pulse voltages that are simultaneously generated in the two coils when the current is turned OFF, the rotor stop position is determined (for example, refer to Japanese Unexamined Patent Application, First Publication No. 2002-335691). Since the pulse widths of the two square-wave pulse voltages that are simultaneously generated in the two coils subtly change in accordance with differences in the rotor stop position, the rotor stop position is specified by comparing both.

Also, as a conventional method of starting a brushless motor, open loop forced energization is performed that forcibly switches the energization without detecting the rotor position, and when the rotor position can be detected, the energization switching is controlled based on the aforementioned pulse signal (for example, refer to Japanese Unexamined Utility Model Application, First Publication No. H06-25224).

In addition, there is also a method of starting a brushless motor which includes putting the rotor position in a locked state by attracting the rotor position to a specific position by applying a first energizing pattern that positions the rotor at a specific position, applying a second energizing pattern that leads the first energizing pattern by 60° for a minimal time, and then applying a third energizing pattern that leads the second energizing pattern by a further 60° (for example, refer to Japanese Unexamined Patent Application, First Publication No. 2001-211684).

Here, as a starting method in the case of the brushless motor rotating in reverse by an external load, there is the method disclosed in Japanese Unexamined Patent Application, First Publication No. 2001-128485. First, after reducing the rotational frequency of the rotor by three-phase energization, the energization during the three-phase energization is repeatedly turned ON/OFF, and the phase difference and the position at which the phase current becomes zero are investigated. The rotational direction is determined from the phase difference of the currents, and in the case of being determined to be in a reverse rotational state, the reverse rotational frequency is found from a generation cycle of zero point at each phase. After an AC current with a reverse rotational frequency is supplied and brought in, the frequency is slowly changed from a reverse direction to a frequency in a forward direction, whereby the motor can be started by raising the rotational frequency of the rotor to a desired rotational frequency.

However, when detecting the stop position of a rotor, in the method as disclosed in Japanese Unexamined Patent Application, First Publication No. 2004-40943, it is necessary to add transistors, resistors, and comparators and the like that constitute a stop position detecting circuit that detects the rotor stop position, thus becoming a factor in complicating the device constitution. Also, as the difference between voltage rise times is small, the inductance difference becomes minute, thereby hindering an accurate determination.

The method disclosed in Japanese Unexamined Patent Application, First Publication No. 2002-335691 has the advantage of eliminating special-purpose circuits, but since the difference between inductances due to the impressed voltage in the three-phase energization is small, the difference between pulse widths of square-wave pulse voltages becomes small, thereby hindering an accurate detection.

Also, among conventional methods of starting a brushless motor, in the case of open loop forced energization being performed, its susceptibility to disturbances causes a high parameter dependency of the brushless motor, which makes the setting of the parameters difficult. Also, continuing forced energization slowly causes the rotor to start to rotate. As a result, the time required for starting the motor becomes longer, and the torque during starting diminishes. Performing forced energization switching many times further increases the susceptibility to disturbances.

In the case of the rotor being put in a locked state by a predetermined energization pattern, and also in the case of measuring inductance, since it is necessary to perform open loop forced energization during the period the brushless motor starts to rotate until the rotor position can be detected, the same issues are involved. Moreover, in the case of putting the rotor in a locked state, in a motor with large inertia, a long time is required for positioning the rotor.

In the case of starting from a reverse rotational state, since the rotational direction and the frequency of rotation are calculated after finding the position at which the phase current becomes zero, complicated processing is required. Also, by slowly changing the frequency from a reverse rotational direction to a frequency in a forward direction, a long time is required until starting.

The present invention was achieved in view of the above circumstances, and has as its main object to start a motor in a short time by a simple method and also to enable high torque to be obtained during starting.

SUMMARY OF THE INVENTION

The invention according to a first aspect of the present invention that solves the aforementioned problem is a driving device that drives a brushless motor, the device includes an energization pattern determining device that, during start-up of the brushless motor, applies to the brushless motor an excitation pattern according to a stop position of a rotor of the brushless motor for an initial energization time and then stops the energization to cause the rotor of the brushless motor to coast; and an excitation switch timing calculating device that determines an excitation timing by detecting the rotor position from an induced voltage that is generated at the motor terminals during coasting of the rotor.

In this driving device for a brushless motor, in order to be able to correctly detect the rotational position of the rotor when starting, it is accelerated and then allowed to coast to detect the rotor position from an induced voltage that is generated during the coasting. Since the induced voltage at this time is in a state of not being influenced by pulse width modulation signals and the like, the rotor position is correctly detected. After detecting the rotor position, ordinary energization switching is performed.

A second aspect of the present invention is the driving device for a brushless motor according to a first aspect of the present invention, in which the initial energization time being of a length that is not longer than the time until a first energization switch timing after the rotor starts rotation.

In this driving device for a brushless motor, acceleration is performed within a range in which the rotor is attracted to the stator and reverse torque does not occur. Therefore, the rotor can be coasted with sufficient rotational speed for rotor position detection.

A third aspect of the present invention is the driving device for a brushless motor according to a first or second aspect of the present invention, in which the excitation switch timing calculating device calculates the excitation timing from a time interval between the second and subsequent induced voltage signals generated at the motor terminals during coasting of the rotor.

In this driving device for a brushless motor, the signal that is generated at the first time during coasting may be a square-wave pulse voltage due to energy that is stored in the coil. Therefore, skipping this signal and using the second and subsequent signals improves the detection accuracy.

A fourth aspect of the present invention is the driving device for a brushless motor according to any one of aspects 1 to 3 of the present invention, which further includes an excitation voltage output device that selects a plurality of excitation patterns that are capable of driving the brushless motor and applies each excitation pattern in turn within a time range in which the rotor does not rotate; a square-wave pulse voltage width detecting device that detects the pulse widths of a square-wave pulse voltage generated in a coil of the brushless motor when switching excitation patterns; and a rotor position estimating device that finds the minimum value or the maximum value from the pulse widths of square-wave pulse voltages in the plurality of excitation patterns and determines the stop position of the rotor from the excitation pattern of the minimum value or maximum value; in which an energization pattern that leads or lags by a predetermined electrical angle from the stop position of the rotor determined by the rotor position estimating device is output as a start-up excitation pattern.

This driving device for a brushless motor investigates the pulse widths of square-wave pulse voltages that are generated when switching excitation patterns for a plurality of types of excitation patterns, with the stop position of the rotor being specified by the maximum value or the minimum value thereof. Since the excitation pattern for starting that is in accordance with the rotor stop position is defined in advance, the driving device starts the brushless motor with that excitation pattern.

A fifth aspect of the present invention is the driving device for a brushless motor according to a fourth aspect of the present invention, in which the excitation voltage output device performs an excitation pattern that does not energize a coil between an excitation pattern that N pole magnetizes the coil and an excitation pattern that S pole magnetizes the same coil.

In this driving device for a brushless motor, after a coil of one phase is N pole magnetized, it is put in a non-energized state before being S pole magnetized and therefore residual magnetization of the coil is released. Since the coil enters a non-energized state also when changing from S-pole magnetization to N-pole magnetization, residual magnetization of the coil is released.

A sixth aspect of the invention is the driving device for a brushless motor according to fourth or fifth aspects of the present invention, in which an excitation pattern having a phase lag of 120 degrees during forward rotation and outputting an excitation pattern having a phase lead of 120 degrees during reverse rotation, when the rotor position estimating device has determined the stop position of the rotor from the minimum value of the pulse widths of the square-wave pulse voltages.

When this driving device for a brushless motor selects an excitation pattern with a phase difference of 120 degrees with respect to the rotor stop position, sufficient torque for starting rotation of the rotor is obtained, and a rotational characteristic is obtained in which the torque increases just after rotation. For this reason, the rotor can be started in a stable manner, and a large acceleration can be obtained.

A seventh aspect of the present invention is the driving device for a brushless motor according to any one of first to sixth aspects of the present invention, which further includes a voltage dividing circuit that divides square-wave pulse voltages generated at the coils and inputs them to the square-wave pulse voltage width detecting device.

In this driving device for a brushless motor, when a square-wave pulse voltage is high, by changing it to a desired voltage level with the voltage dividing, circuit signal processing becomes possible.

An eighth aspect of the invention is the driving device for a brushless motor according to any one of fourth to seventh aspects of the present invention, in which, when the rotor is rotating in reverse, impressing a low duty ratio voltage and running the excitation voltage output device after applying a brake to the rotor.

This driving device for a brushless motor detects the rotor stop position after putting the rotor in a stopped state or nearly stopped state by applying the brake to the rotor during reverse rotation. In accordance with the detected rotor stop position, starting process is performed.

A ninth aspect of the invention is the driving device for a brushless motor according to eighth aspect of the present invention, which further includes a filter that removes noise that is included in the detection signal of the terminal voltage in a device that detects the terminal voltage of each phase of the brushless motor and a filter delay phase correction device that corrects the delay phase of the filter that changes in accordance with the rotational speed of the brushless motor in the excitation switch timing calculating device.

This driving device for a brushless motor corrects the excitation pattern switching timing in consideration of the phase delay due to the filter, and enables phase switching with an appropriate timing.

A tenth aspect of the invention is the driving device for a brushless motor according to ninth aspect of the present invention, in which the filter is a primary CR filter that removes noise that is generated when performing pulse width modulation control of the brushless motor.

This driving device for a brushless motor has a characteristic of removing high frequency component noise in the pulse width modulation control, and so a phase delay easily occurs when the rotational speed of the brushless motor is high. The filter delay phase correction device corrects such a phase delay.

A eleventh aspect of the invention is the driving device for a brushless motor according to tenth aspect of the present invention, in which the excitation switch timing calculating device further includes a circuit delay phase correction device that corrects the delay phase due to circuits other than the filter.

This driving device for a brushless motor has a function of correcting the delay phase that is characteristic to a device that is independent of rotational speed.

A twelfth aspect of the invention is a method of starting a brushless motor, the method comprising: energizing the brushless motor with an excitation pattern according to a stop position of a rotor of the brushless motor for an initial energization time and then stopping the energization to cause the rotor of the brushless motor to coast; detecting the rotor position from an induced voltage that is generated at the motor terminals during coasting of the rotor; and performing switching of the excitation pattern based on the detected rotor position.

In this method of starting a brushless motor, when the rotor starts rotation, the energization is stopped to cause the rotor to coast. The position of the rotor during rotation is detected from the induced voltage generated at this time. Thereafter, drive controlling of the brushless motor is performed by carrying out ordinary energization switching based on the position of the detected rotor.

A thirteenth aspect of the invention is the method of starting a brush motor according to twelfth aspect of the present invention, in which the initial energization time is of a length that is not longer than the time until a first energization switching timing after the rotor starts rotation, and the step of detecting the rotor position is performed until the induced voltage, which is generated at the motor terminals when rotating the rotor, is generated fourth time.

In this method of starting a brushless motor, during start-up the rotor is made to coast after being accelerated until a time corresponding to the first energization switching timing, and the rotor position is detected until the time corresponding to the fourth energization switching timing.

A fourteenth aspect of the invention is a method of detecting a stop position of a rotor of a brushless motor, which includes selecting a plurality of excitation patterns that are capable of driving the brushless motor; selecting an energization sequence so that an excitation pattern that does not energize a coil of the brushless motor is applied between an excitation pattern that N pole magnetizes the coil and an excitation pattern that S pole magnetizes the same coil; energizing with each excitation pattern in turn within a time range in which the rotor does not rotate; and determining the stop position of the rotor from the minimum value of pulse widths of square-wave pulse voltages generated in the coil of the brushless motor when switching the excitation pattern.

In this method of detecting a stop position of a brushless motor, after a coil of one phase is N pole magnetized, it is put in a non-energized state before being S pole magnetized, and therefore residual magnetization of the coil is released. Since the coil enters a non-energized state when changing from S pole magnetization to N pole magnetization, residual magnetization of the coil is released and detection accuracy of the rotor stop position is improved.

A fifteenth aspect of the invention is a method of starting a brushless motor, which includes, when starting up a brushless motor, selecting a plurality of excitation patterns that are capable of driving the brushless motor; energizing with each excitation pattern in turn within a time range in which the rotor does not rotate; investigating the pulse width of a square-wave pulse voltage that is generated in a coil of the brushless motor when switching the excitation pattern; determining the stop position of the rotor from the minimum value thereof; outputting an excitation pattern having a phase lag of 120 degrees from the rotor stop position during forward rotation; and outputting an excitation pattern having a phase lead of 120 degrees from the rotor stop position during reverse rotation.

In this method of starting a brushless motor, by selecting an excitation pattern with a phase difference of 120 degrees with respect to the rotor stop position, sufficient torque for starting rotation of the rotor is obtained, and it is possible to increase the torque just after rotation. Therefore, a brushless motor can be reliably started.

A sixteenth aspect of the invention is a method of starting a brushless motor, which includes: detecting the stop position of a rotor of the brushless motor by utilizing the inductance of a coil; stopping energization all the phases after outputting an excitation pattern with a phase lag of 120 degrees from the stop position of the rotor for a prescribed time; performing energization control based on a detected rotor position when rotor position detection by induced voltage is possible in the state of having stopped energization to all phases; and energizing with an excitation pattern so as to stop rotation of the rotor when rotor position detection by induced voltage is impossible in the state of energization of all phases being stopped; in which a step of detecting the rotor stop position by utilizing the inductance of the coil after energizing with an excitation pattern for a predetermined time so as to stop rotation of the rotor is performed.

In this method of starting a brushless motor, when performing start-up control so as to cause the brushless motor to rotate forward, if the rotor position can be detected, the processing proceeds to ordinary rotational control. In contrast, when the rotor position cannot be detected, the rotor is determined to be rotating in reverse, a brake is applied to the rotor, and the start-up control is performed again.

In accordance with the present invention, it is possible to detect induced voltage generated at the motor terminals without being influenced by pulse width modulation signals or the like by making a coasting state during starting. Because of this, it is possible to accurately detect rotor position without being influenced by disturbances. Also, because rotor position is detected during the coasting, it is possible to detect rotor position in a short time and to shift to ordinary operation.

In the case of brushless motor being determined not to be in forward rotation during starting, by performing starting process again after performing energization control so as to stop rotor, it is possible to start quickly to forward rotational direction even from reverse rotational direction state. In this way, it is possible to eliminate complicated processing to determine reverse rotational direction.

BRIEF DESCRIPTION OF THE DRAWINGS

FIG. 5 is a drawing that schematically describes the excitation patterns during start-up and the flow of magnetic flux when energizing with those excitation patterns.

FIG. 18 is a drawing explaining the procedure and timing when measuring the square-wave pulse voltage widths two times each.

DETAILED DESCRIPTION OF THE INVENTION

The best modes for carrying out the invention shall be described in detail with reference to the drawings. Note that the same reference numbers are used to denote the same constituent elements in the embodiments. Also, overlapping explanations in the embodiments shall be omitted.

First Embodiment

Figure 1:
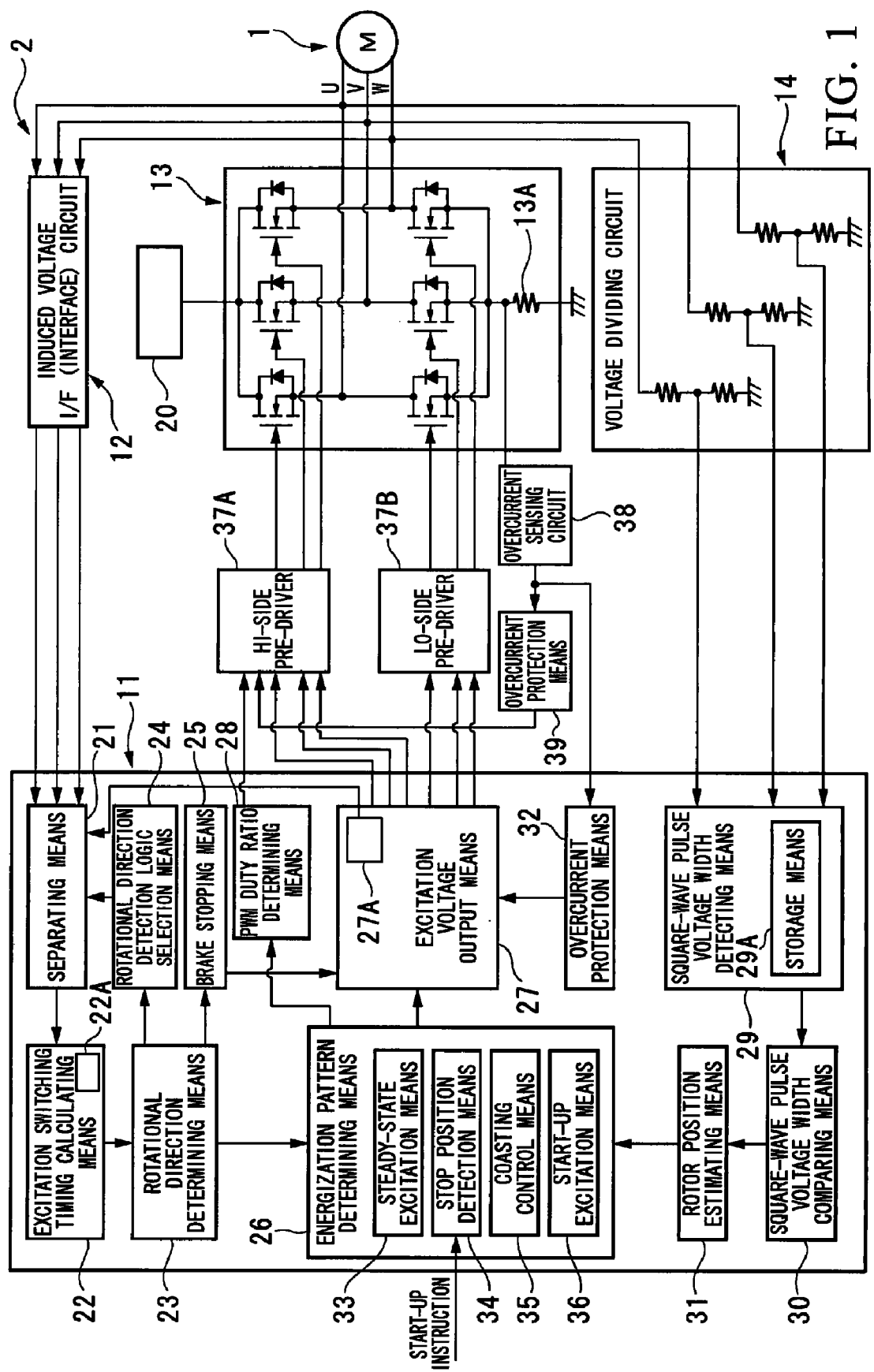
FIG. 1 is a block diagram showing an outline configuration of the driving device of the brushless motor according to an embodiment of the present invention.

As shown in FIG. 1, a brushless motor system has a brushless motor 1 and a driving device 2 that controls the rotational driving of the brushless motor 1.

The brushless motor 1 has a rotor that has permanent magnet and a stator. In the stator, coils of three phases (U, V, W) are wound in that order in the circumferential direction. This brushless motor system is a sensor-less type system that does not have a sensor that detects the rotor position.

The driving device 2 has a control unit 11 which is formed of microcomputers and the like, an induced voltage I/F (interface) circuit 12 that detects the voltage that is impressed on the current-carrying wires that form the coils of three phases of the brushless motor 1, an inverter 13, and a voltage dividing circuit 14 that is a level conversion circuit that converts the level of the voltage that is impressed on the current-carrying wires of the brushless motor 1, in which pre-drivers 37A and 37B, an overcurrent sensing circuit 38, and an overcurrent protection device 39 are provided between the control unit 11 and the inverter 13.

Figure 2:
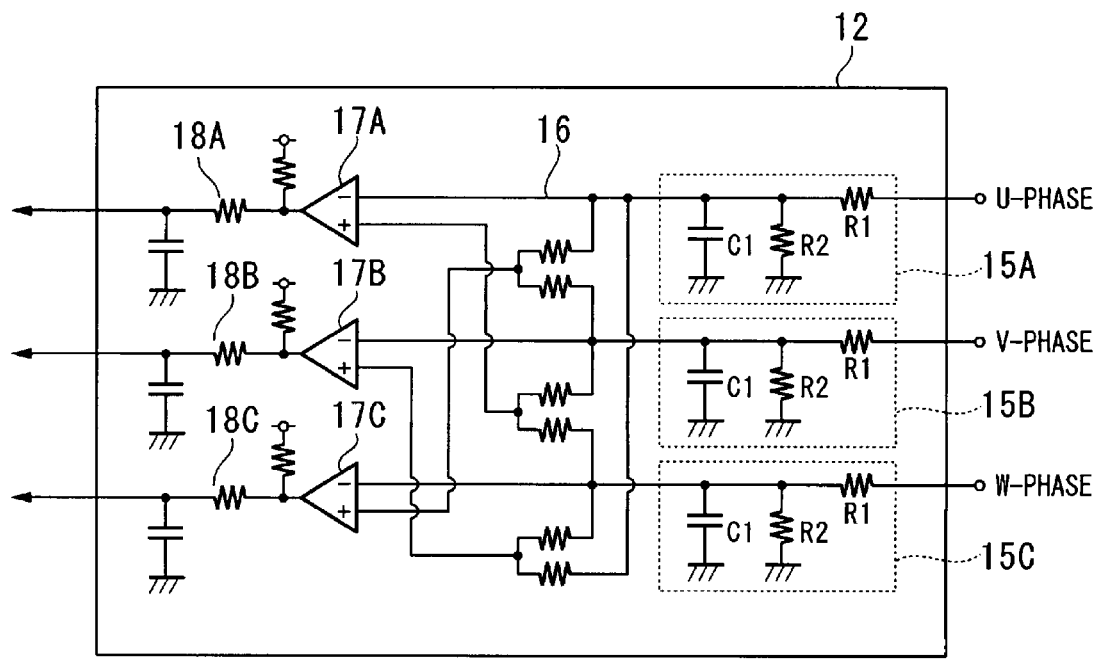
FIG. 2 is a drawing illustrating a specific circuit configuration of the induced voltage I/F circuit.

As shown in FIG. 2, the induced voltage I/F circuit 12 has low-pass filter circuits 15A, 15B, 15C into which the motor terminal voltages (analog signals) of the three respective phases are input, and each of which being formed of a voltage dividing circuit (resistor R1 and resistor R2) that divides the voltage into a voltage that can be input into comparators 17A to 17C and a primary CR filter (resistor R2 and capacitor C1) that removes noise of a pulse width modulation signal; a circuit 16 that detects the equivalent neutral-point potential, and comparators 17A, 17B, and 17C that create a pulse signal from the equivalent neutral-point potential and the analog signal of the induced voltage that appears on a phase to which a current is not applied (open section); and low-pass filters (primary CR filter) 18A, 18B, and 18C that cut chattering component from the output of the comparators 17A to 17C.

Here, the circuit 16 that detects the equivalent neutral-point potential adopts a two-phase comparison method that, for example, detects the equivalent neutral-point potential from the motor terminal voltages of V-phase and W-phase for the U phase. By doing so, an approximately flat voltage is obtained as the equivalent neutral-point potential. It is also acceptable to use a three-phase comparison method that finds the equivalent neutral-point potential by using the signals of all three of the U, V, and W phases.

In this case, the equivalent neutral-point potential is an approximate triangular wave that is centered at ½ of the source voltage.

The comparators 17A to 17C generate pulse signals that output a low-level signal when the analog signal of the induced voltage is higher than the equivalent neutral-point potential and output a high-level signal when the analog signal of the induced voltage is lower than the equivalent neutral-point potential. In each comparator 17A to 17C, a pulse signal with an angular resolution of 120 degrees electrical angle is created. These signals are input to a composite signal formation circuit 19 through the low-pass filter circuits 18A to 18C.

The inverter 13 is a circuit that is formed by bridge connecting each two of six switching elements between the positive-negative terminals of a power supply 20. The inverter 13 converts the DC voltage that is supplied from the power supply 20 to an AC voltage based on the pulse width modulation signal (driving signal) that is input from the control unit 11 and impresses it on each phase of the brushless motor 1. Note that a shunt resistor 13A is provided between the inverter 13 and the ground level. The current that flows to the inverter 13 using the shunt resistor 13A, that is, the current that is input to the brushless motor 1, can be detected using the overcurrent sensing circuit 38.

The voltage dividing circuit 14 is a circuit that divides the terminal voltage (e.g., 12V or 36V and the like) generated in each of the current-carrying wires of the brushless motor 1 by two resistors into a voltage level that can be used by the control unit 11 (e.g., 3V or 5V and the like).

The control unit 11 has a separating device 21 that is connected to the induced voltage I/F circuit 12; an excitation switch timing calculating device 22; a rotational direction determining device 23; a rotational direction detection logic selection device 24; a brake stopping device 25; an energization pattern determining device 26; an excitation voltage output device 27; and a PWM duty ratio determining device 28. Also, the control unit 11 has a square-wave pulse voltage width detecting device 29 that is connected to the voltage dividing circuit 14 and is used during starting; a square-wave pulse voltage width comparing device 30; and a rotor position estimating device 31. Moreover, it has an overcurrent protection device 32 that is connected to the overcurrent sensing circuit 38.

The separating device 21 performs a processing to separate the edge of the pulse signal that is input from the induced voltage I/F circuit 12 into the edge of the induced voltage and the edge of the square-wave pulse voltage. The excitation switch timing calculating device 22 generates one pulse signal with an angular resolution of 60 degrees electrical angle from the three pulse signals with an angular resolution of 120 degrees electrical angle to compute the excitation phase in accordance with the induced voltage edge and calculates the excitation switch timing. A delay phase correction portion 22A that corrects the excitation switch timing is provided in the excitation switch timing calculating device 22.

The rotational direction determining device 23 determines the rotational direction from the excitation switch timing, and outputs a predetermined instruction to the rotational direction detection logic selection device 24 and to the brake stopping device 25. The rotational direction detection logic selection device 24 is used in the case where the logic that the separating device 21 uses depending on the rotational direction of the brushless motor 1 is selectable. The brake stopping device 25 is used when energizing an energizing pattern so as to stop the brushless motor 1.

The energization pattern determining device 26 has a steady-state excitation device 33, a stop position detection device 34, a coasting control device 35, and a start-up excitation device 36. The steady-state excitation device 33 decides an excitation pattern in accordance with the rotor position with the excitation switch timing that is calculated by the excitation switch timing calculating device 22. The stop position detection device 34 receives a start instruction from outside and generates a pulse width modulation signal for detecting the rotor stop position to an excitation voltage output device 27. The start-up excitation device 36 decides an excitation pattern in accordance with the rotor stop position corresponding to the square-wave pulse voltage width that is decided to be a minimum by the rotor position estimating device 31. The coasting control device 35 performs a process that applies the start-up excitation pattern for a predetermined initial energization time Ts1 and then allows the brushless motor 1 to coast to detect the rotor position. These processes are explained in detail later.

The excitation voltage output device 27 outputs a signal to impress an excitation current on the coil of the brushless motor 1 to each of the pre-drivers 37A and 36B. The hi-side pre-driver 37A is a driver that performs ON/OFF switching of the switching elements on the high-potential side by the duty ratio that is decided by the PWM duty ratio determining device 28. The lo-side pre-driver 37B is a driver that performs ON/OFF switching of the switching elements on the low-potential side. The hi-side pre-driver 37A has a function that turns off each switching element when a signal is input from the overcurrent protection device 39 at the time of an overflow current flowing to the inverter 13. Also, when an overflow current is detected, a signal is input to the overcurrent protection device 32 and a software reset is applied.

The square-wave pulse voltage width detecting device 29 performs a processing to detect a square-wave pulse voltage width from the signal that is input from the voltage dividing circuit 14. The square-wave pulse voltage width detecting device 29 has a storage device 29A such as a memory, and can store data of the detected square-wave pulse voltage width in association with the excitation pattern at that time. The square-wave pulse voltage width comparing device 30 compares the data of a plurality of detected square-wave pulse voltage widths stored in the storage device 29A of the square-wave pulse voltage width detecting device 29 and determines the one that is a minimum. The rotor position estimating device 31 estimates the rotor position during standstill and during low speed based on the comparison result of the square-wave pulse voltage widths.

Next, the operation of the driving device 2 shall be described.

When starting the brushless motor 1, there are cases where the brushless motor 1 is standstill and cases where the brushless motor 1 is being made to rotate by an external load. Moreover, in the case of the brushless motor 1 being made to rotate, there are cases where it is rotating in forward direction and cases where it is rotating in reverse direction. For example, in the case of using the brushless motor 1 for a rotating mechanism of a radiator fan, when wind blows from the radiator to the direction of the engine room, the brushless motor 1 is made to rotate in forward in accordance with the rotation of the radiator fan even if energization is not performed. In contrast, it is conceivable for the brushless motor 1 to rotate in reverse when wind is blowing from the engine side in the direction of the radiator or when a negative pressure occurs in the reverse direction with respect to the radiator fan.

In the case of assuming the driving device 2 to be used for the radiator fan, the radiator fan has a structure that allows it to readily rotate in the forward direction, with a strong wind force needed in order to make it rotate in the reverse direction. However, there is a low possibility of a large wind force occurring in the reverse direction due to the configuration of the vehicle, and even if the radiator fan rotates in reverse, the rotational speed would conceivably be low. Accordingly, in the driving device 2, even if the brushless motor 1 rotates in reverse by an external load, control during starting is performed assuming the rotational frequency and the torque are small.

Figure 3:
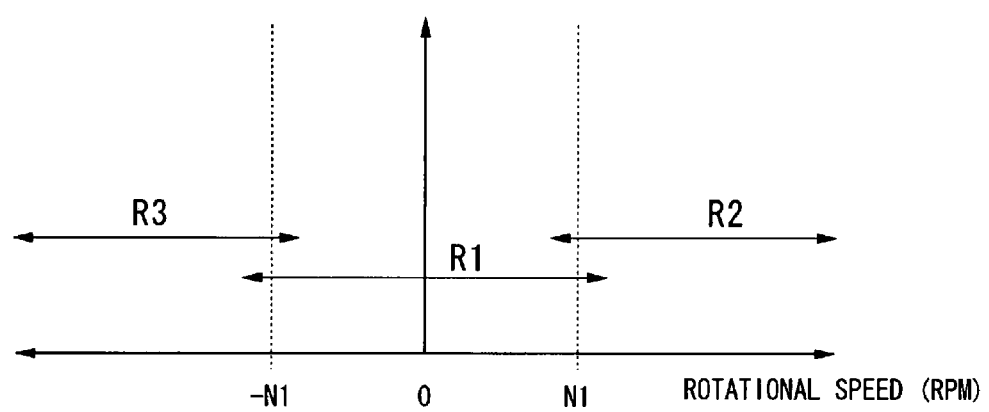
FIG. 3 is a drawing that schematically describes the switching of the process according to the rotational speed during start-up.

FIG. 3 schematically shows a division of starting methods depending on the rotational speed of the brushless motor 1 during starting. The driving device 2 will perform start-up initiation processing by inductance detection if the rotational speed of the brushless motor 1 shown as the horizontal axis is in the region R1 containing zero. If the rotational speed is in the region R2 where rotational speed in the forward direction is larger than the region R1, rotor position detection is performed by induced voltage detection to perform rotation control. When the rotational speed in the reverse rotational direction is larger than the region R1, reverse rotational state discrimination processing, rotor stop processing, and start-up initiation processing by inductance detection are performed. The region R1 and the region R2 overlap near the rotational speed N1 (rpm). The rotational speed N1 corresponds to the low rotational speed where rotor position detection by induced voltage detection becomes impossible. This is because, when the rotational speed is zero or low speed, the rotor position is detected by inductance detection with an angular resolution of 60 degrees electrical angle, and energization can be performed at a phase that enables generation of maximum torque in the forward rotational direction, however, as the rotational speed rises the detection result of the rotor position by inductance detection results in worsened detection accuracy due to the shifts in the phase from 60 degrees electrical angle. Consequently the starting torque decreases compared to the standstill condition.

Also, in the region R3 smaller than R1, that is, where the rotational speed in the reverse rotational direction is large, rotor position detection is performed after applying a brake to the brushless motor 1 as described below. The region R1 and the region R3 overlap near the rotational speed –N1 (rpm).

Here, the region R1 and the region R2 may be divided at the rotational speed N1 without overlapping, and the region R1 and the region R3 may be divided at the rotational speed –N1 without overlapping.

The driving device 2 initially performs a processing assuming that the rotational speed of the brushless motor 1 is in the region R1, and shifts to steady driving via processing equivalent to the region R2. In the case that rotor position detection cannot be performed when performing the processing corresponding to the region R2, the brushless motor 1 is regarded as being in region R3, and the position detection is performed again from the processing corresponding to the region R3. An illustrative example of this starting method is explained referring to the flowchart in FIG. 4.

When a start-up initiation instruction is input to the stop position detection device 34, overflow current detection is performed (step S101). The overcurrent is monitored by a current value that flows through the shunt resistor 13A of the inverter 13. When the current that flows through the shunt resistor 13A exceeds a predetermined value, the current is judged as being an overcurrent, that is, an overload state ("Yes" in step S101), and a stop process is carried out by turning off all phases (step S102) to end the process. When an overcurrent is not detected ("No" in step S101), a process to detect the rotor position by inductance detection is carried out (step S103). Checking for an overcurrent is constantly performed by a separate program that runs in parallel, so that if an overcurrent is detected while executing a process from step S103 onward, the process is stopped at that point.

When the rotor stop position is detected by inductance detection, the start-up excitation device 36 decides the start-up excitation pattern with the phase that is capable of generating the maximum torque with respect to that rotor position, and the excitation voltage output device 27 outputs a start-up excitation pattern (step S104). An initial energization counter is activated, and the aforementioned phase is energized until the constant initial energization time Ts1 set in advance elapses (step S105). When the initial energization time Ts1 elapses ("Yes" in step S105), the coasting control device 35 allows the rotor to coast by turning off energization to all phases (step S106). Position detection of a rotor 41 is performed using forward rotation specific logic from the induced voltage that is generated while the rotor 41 is coasting by inertia (step S107). When the rotor position can be detected a predetermined number of times ("Yes" in step S108), the processing proceeds to sensorless driving (steady driving mode) by induced voltage using the steady-state excitation device 33 (step S1109).

When the rotor position cannot be detected the predetermined number of times ("No" in step S1108), the processing waits until the counter that measures the edge intervals of the induced voltage overflows the predetermined number of times (step S110). When the counter overflows the predetermined number of times ("Yes" in step S110), the rotational direction determining device 23 judges the brushless motor 1 to be rotating in reverse. As a result, two-phase energization lock processing is performed with a low duty ratio as brake process by the brake stopping device 25 (step S111). The brake process is performed for a prescribed time defined in advance, and when this time elapses (step S112), the processing returns to step S101.

From step S103 to step S105, the initial rotational speed is in the range of the region R1, are the processes to accelerate to region R2 from region R1.

Step S103 shall be explained in detail. Here, the stop position is decided focusing on the fact that when the direction of the magnetic flux produced by the coil and the direction of magnetic flux of the magnet are in the same direction, the magnetic permeability of the magnet cores increases and the inductance decreases.

When starting the brushless motor 1 in a stopped state, a start-up instruction is input from outside to the stop position detection device 34 of the control unit 11. The stop position detection device 34 outputs an instruction to the excitation voltage output device 27 so that six predetermined excitation patterns for stop position determination are continued for a period during which the rotor does not rotate. The period during which the rotor does not rotate differs depending on the inertia of the brushless motor 1, but, for example, is a period from several microseconds to several milliseconds, and is counted by a counter provided in the control unit 11. The excitation voltage output device 27 outputs the pulse width modulation signal in accordance with the excitation pattern to the inverter 13. In accordance with the pulse width modulation signal, the switching elements are switched ON or OFF so that any two of the three phases are energized.

Here, FIG. 5 shows the excitation patterns for stop position determination that the stop position detection device 34 issues. These excitation patterns No. 1 to No. 6 are patterns that are capable of driving the brushless motor 1.

In the excitation pattern No. 1, a current flows from the U-phase coil (hereinafter referred to as the U phase) to the V-phase coil (hereinafter referred to as the V phase). The U phase is N pole magnetized, and the V phase is S pole magnetized. When the arrangement of the U, V, and W phases and the stop position of the rotor 41 are in the arrangement that is illustrated, magnetic flux is formed from the U phase, passing through the S-pole and the N-pole of the permanent magnet 42 of the rotor 41 in this order, to the V phase as shown by the arrow.

In the excitation pattern No. 2, a current flows from the U phase to the W phase. The U phase is N pole magnetized, and the W phase is S pole magnetized. Magnetic flux is formed from the U phase, passing through the S-pole and the N-pole of the permanent magnet of the rotor 41 in this order, to the W phase as shown by the arrow.

In the excitation pattern No. 3, a current flows from the V phase to the W phase. The V phase is N pole magnetized, and the W phase is S pole magnetized. Magnetic flux is formed from the V phase, passing through the S-pole and the N-pole of the permanent magnet of the rotor 41 in this order, to the W phase as shown by the arrow.

In the excitation pattern No. 4, a current flows from the V phase to the U phase. The V phase is N pole magnetized, and the U phase is S pole magnetized. Magnetic flux is formed from the V phase, passing through the S-pole and the N-pole of the permanent magnet of the rotor 41 in that order, to the U phase as shown by the arrow.

In the excitation pattern No. 5, a current flows from the W phase to the U phase. The W phase is N pole magnetized, and the U phase is S pole magnetized. Magnetic flux is formed from the W phase, passing through the S-pole and the N-pole of the permanent magnet of the rotor 41 in this order, to the U phase as shown by the arrow.

In the excitation pattern No. 6, a current flows from the W phase to the V phase. The W phase is N pole magnetized, and the V phase is S pole magnetized. Magnetic flux is formed from the W phase, passing through the S-pole and the N-pole of the permanent magnet of the rotor 41 in this order, to the V phase as shown by the arrow.

Figure 6:
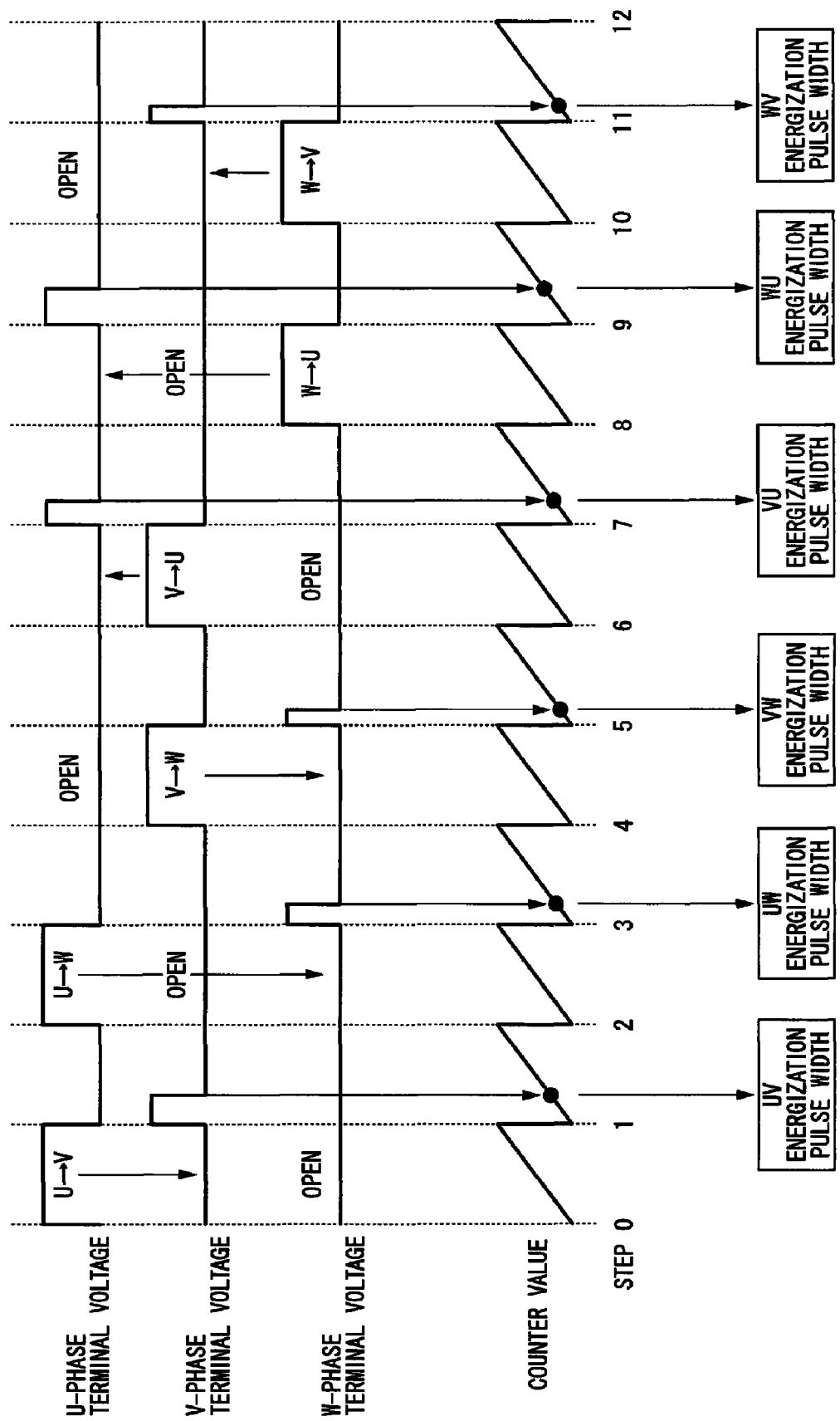
FIG. 6 is a graph describing the procedure of measuring the square-wave pulse voltage width for each excitation pattern and the timing.

As shown in FIG. 6, the stop position inspection of the rotor 41 in this embodiment performs energization control with steps 0 to 11 as one set. Each of the steps is incremented each time the value of the counter in the control unit 11 reaches a predetermined value. Every time incrementing a step, the counter is reset.

In step 0, the energization pattern No. 1 is selected, which energizes with the duty ratio of the pulse width modulation signal set to 100%. The remaining W phase is opened. In step 1, by setting the duty ratio to 0% none of the phases are energized. In transition to step 1 after step 0 is complete, the moment the switching elements of the inverter 13 turn off, the electrical energy that is stored in the coil flows as current via a free wheel diode of the switching elements. A square-wave pulse voltage is generated at the V-phase terminals at this time. The terminal voltage, as a square-wave pulse voltage, is introduced into the voltage dividing circuit 14 to be divided, and then is input to the square-wave pulse voltage width detecting device 29. The square-wave pulse voltage width detecting device 29 checks the count value when it detects the falling edge of a pulse. Since the count value corresponds to the elapsed time from the switching timing of the step, this count value is stored in the storage device 29A as a square wave pulse voltage width with respect to the excitation pattern No. 1 (UV energization).

In step 1, together with executing the process of the square-wave pulse voltage width detecting device 29 and the like, the counter is counted up. When the count value becomes a predetermined value as same as step 0, the counter is reset and the processing proceeds from step 1 to step 2. In step 2, the excitation pattern No. 2 is used, and the pulse width modulation signal duty ratio is set to 100%. The remaining V phase is opened. In step 3, by setting the duty ratio to 0% none of the phases are energized. The count value is checked when the edge of the square-wave pulse voltage generated in the W phase falls and stored in the storage device 29A as a square wave pulse voltage width with respect to the excitation pattern No. 2 (UW energization).

In step 4, the U phase is opened by energizing with the excitation pattern No. 3. In step 5, without energizing any of the phases, the pulse width of the square-wave pulse voltage generated in the W phase is checked and stored in the storage device 29A as a square wave pulse voltage width with respect to the excitation pattern No. 3 (VW energization).

In step 6, the W phase is opened by energizing with the excitation pattern No. 4. In step 7, without energizing any of the phases, the pulse width of the square-wave pulse voltage generated in the U phase is checked and stored in the storage device 29A as a square wave pulse voltage width with respect to the excitation pattern No. 4 (VU energization).

In step 8, the V phase is opened by energizing with the excitation pattern No. 5. In step 9, without energizing any of the phases, the pulse width of the square-wave pulse voltage generated in the U phase is checked and stored in the storage device 29A as a square wave pulse voltage width with respect to the excitation pattern No. 5 (WU energization).

In step 10, the U phase is opened by energizing with the excitation pattern No. 6. In step 11, without energizing any of the phases, the pulse width of the square-wave pulse voltage generated in the V phase is checked and stored in the storage device 29A as a square wave pulse voltage width with respect to the excitation pattern No. 6 (WV energization).

At the timing of step 12 that follows step 11, the rotor position estimating device 31 investigates the excitation pattern with the minimum value among the square wave pulse voltage widths of the excitation patterns No. 1 to No. 6 that are stored in the storage device 29A of the square-wave pulse voltage width detecting device 29, and sets the rotor position where the inductance by that excitation pattern becomes a minimum as the stop position of the rotor 41. In the example of FIG. 5, since the magnetic flux most readily flows in the excitation pattern No. 6, the pulse width of the square-wave pulse voltage of the excitation pattern No. 6 becomes the smallest. The position of the rotor 41 at this time is the stop position.

The process of the rotor position estimating device 31 is specifically explained in detail below. In the case of the count value of the square-wave pulse voltage width being known in advance to be 1000 or less, a value greater than 1000 is stored as an initial value in a memory that stores the minimum value to be compared with the count value of the square-wave pulse voltage width of the excitation pattern No. 1. When the count value is smaller, the data to be stored in the minimum value memory is substituted with the count value of the excitation pattern No. 1 from the initial value. The data of the minimum value memory is thus compared in turn with the count values of all of the square-wave pulse voltage widths, with the count value which is smaller, stored in the minimum value memory. The count value that is finally stored becomes the minimum value, and the excitation pattern at that time becomes the excitation pattern in which the square-wave pulse voltage width becomes a minimum.

Figure 7:
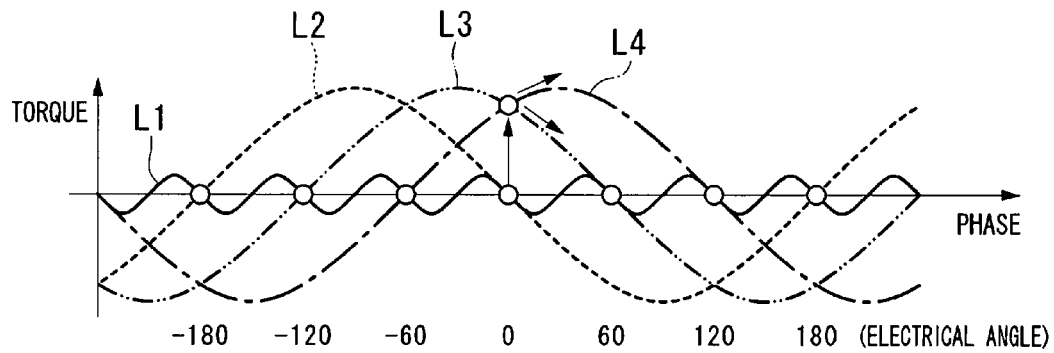
FIG. 7 is a graph for describing a relationship between the rotor position and the start-up excitation pattern.

The step S104 shall be explained in detail. The start-up excitation device 36 selects as the excitation pattern during start-up the excitation pattern that has a 120 degree lag in the rotational direction from the excitation patterns in which the square-wave pulse voltage width becomes a minimum. This is explained in FIG. 7 with a specific example. In FIG. 7, the horizontal axis represents the phase (electrical angle), while the vertical axis represents the torque. The line L1 shows the cogging torque, and the lines L2 to L4 respectively show the relationship between the phase and the torque in the energization patterns No. 6, No. 1, and No. 2. For example, in the case of the square-wave pulse voltage width being the minimum in the excitation pattern No. 6 that energizes from the W phase to the V phase, by making the excitation pattern No. 6 the start-up excitation pattern, since the torque at 0 degree electrical angle is zero, the brushless motor 1 cannot be rotated. The forward torque at 0 degree electrical angle is large for the excitation pattern No. 1 that leads by one (60 degree phase delay energization) and the excitation pattern No. 2 that leads by two (120 degree phase delay energization). However, by starting with the excitation pattern No. 1 shown by line L3, since the torque subsequently decreases, the force for rotating the rotor 41 is small. In contrast, by starting with the excitation pattern No. 2 shown by line L4, since the torque subsequently increases, it is possible to rotate the rotor 41 with a greater force.

Figure 8:
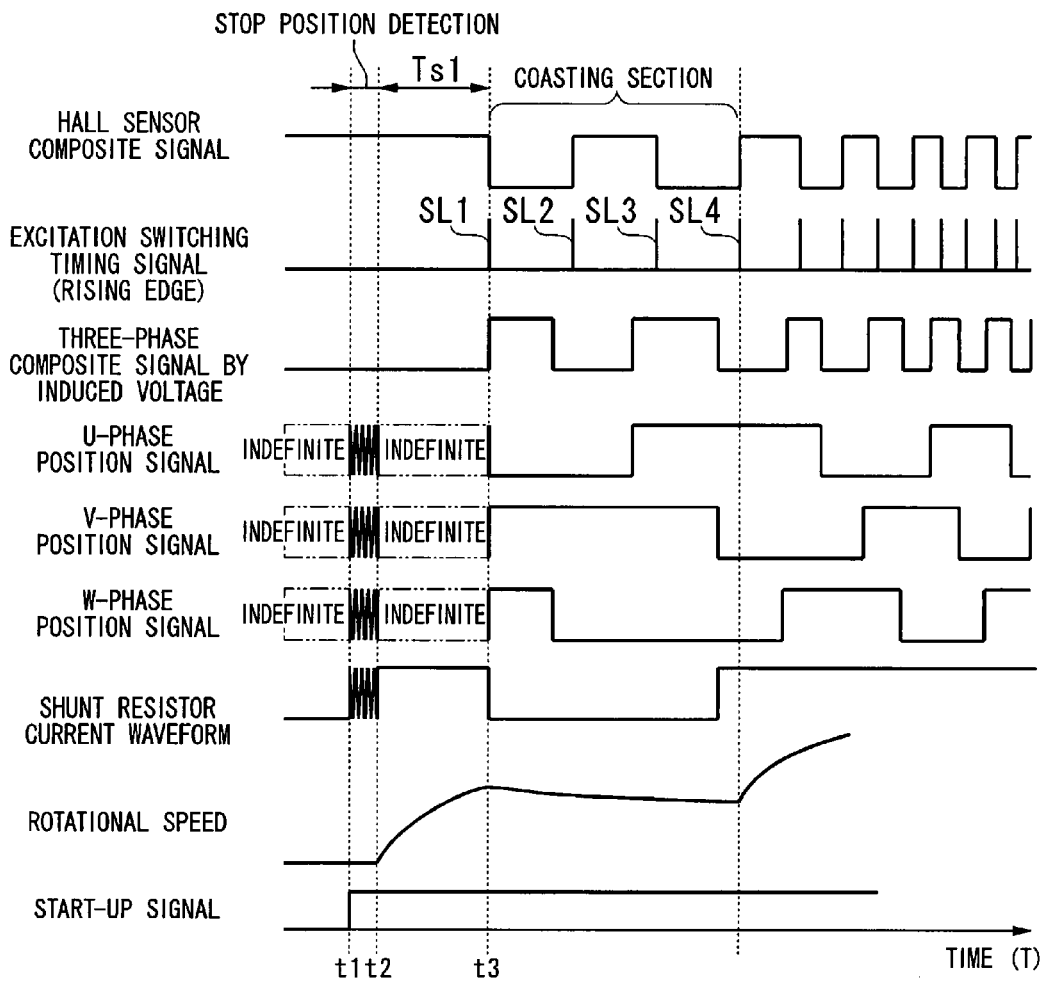
FIG. 8 is a timing chart for specifically describing the processing during start-up.

The processes thus far are described in greater detail in FIG. 8. In FIG. 8, the horizontal axis represents elapsed time, while various information is arranged on the vertical axis. Note that the Hall sensor composite signal that is shown at the top end is a signal that is assumed as the output of a Hall sensor in the case of a Hall sensor being installed.

When the start-up signal is input at time t1, the rotor stop position detection process (step S103) is performed until time t2. The rotational speed during this period is zero.

When the rotor stop position is determined at time t2, as shown by the current waveform of the shunt resistor 13A, the start-up excitation device 36 energizes by continuing the start-up excitation pattern for the initial energization time Ts1 (step S104). During this time, the rotational speed of the rotor 41 slowly increases.

Here, the initial energization time Ts1 is the time during which it is possible to accelerate the rotor 41 so as to be able to allow it to coast at rotational speed N1 or greater after the energization is turned off and until the edge of the induced voltage occurs a plurality of times, for example four or more times. From this standpoint, the initial energization time Ts1 is preferably long. However, when the initial energization time Ts1 is too long, the switching position of the excitation pattern is exceeded during normal operation, thereby continuing the same excitation pattern. This leads to the generation of reverse torque, causing the rotor 41 to decelerate. Accordingly, the initial energization time Ts1 is preferably as long as possible within a range in which reverse torque does not occur. As an example of a method of determining the initial energization time Ts1, the brushless motor 1 is operated with a Hall sensor in the design stage or manufacturing stage, and the time by which the signal of the Hall sensor first changes is measured. The time that is approximately the same as this time or a shorter time can be stored in the control unit 11 as the initial energization time Ts1.

When the initial energization time Ts1 has elapsed at time t3, the coasting control device 35 turns off energization of all the phases (corresponding to step S106). The current value that is measured by the shunt resistor 13A becomes zero, and the rotor 41 coasts. Thereafter, the rotational speed gradually decreases over time. At time t3, a pulse appears at each position signal. For this reason, a first signal SL1 is generated at the excitation switch timing signal corresponding to the rising edge of the three-phase composite signal. The pulse signal at this time is generated due to the generation of square-wave pulse voltages at the motor terminal voltages of all three phases when the energy that is stored in the coil of the stator is discharged as the fly wheel pulse. In the case of ordinary driving, these square-wave pulse voltages can be ignored by the separating device 21. However, due to the logic that turns off all of the phases at time t3, an exceptional state arises that is not possible during ordinary operation, and so, without being capable of ignoring the square-wave pulse voltage, leads to an erroneous detection. For this reason, the first signal SL1 after start-up is not used for detection of the rotor position.

Moreover, because the rotor 41 coasts, induced voltage is generated at the motor terminals of the predetermined phase in accordance with the rotational position of the rotor 41. In this case, rising edges or falling edges are generated in the order of the W-phase position signal, the U-phase position signal, and the V-phase position signal. As a result, as the excitation switch timing signal, a second signal SL2 that occurs at the edge of the W phase, a third signal SL3 that occurs at the edge of the U phase, and a fourth signal SL4 that occurs at the edge of the V phase are generated. By turning all phases off, it is possible to measure the intersection of the induced voltage and the equivalent neutral point potential in the state with no unnecessary signal components such as the pulse width modulation signal that is input from the inverter 13 to the brushless motor 1. Thus it is possible to accurately measure the rotor position.

During this time, the excitation switch timing calculating device 22 measures the time interval between the second signal SL2 and the third signal SL3 to compute 60 degrees electrical angle. Moreover, it measures the time interval between the third signal SL3 and the fourth signal SL4 to compute 60 degrees electrical angle. Based on these time intervals, it computes the excitation switch timing by leading, for example, 30 degrees electrical angle from the fourth signal SL4. Then, thereafter, based on the three-phase composite signal that is produced from the comparison result between the motor terminal voltage and the equivalent neutral point potential, the excitation switch timing is determined, and by performing switching control of the energization pattern, synchronized operation of the brushless motor 1 is performed. Driving with an equivalent performance with driving by 120 degrees electrical angle rectangular wave in the case of having a Hall sensor becomes possible, whereby rotational speed is controlled.

In a brushless motor with large inertia, the fifth signal onward may be acquired to similarly calculate the excitation energization timing from the time interval. The stability and accuracy during start-up can be further improved.

Also, in a brushless motor with large inertia, the time interval between the second and third signals SL2, SL3 and the time interval between the third and fourth signals SL3, SL4 are approximately equivalent. For this reason, it is acceptable to shift to sensorless driving with only the second and third signals SL2, SL3. By doing so, it is possible to initiate steady driving in an even shorter time. Also, it is acceptable to shift to sensorless driving by acquiring only the time interval of the first signal SL1 and the second signal SL2. This is effective for a brushless motor with small inertia. In this case, a preset value is used for the initial energization time SL1, and at the point of detecting the timing of SL2, the time interval of SL1 and SL2 can be calculated and used as the rotor position signal. Therefore, it is possible to shift to sensorless driving until the second signal SL2.

Also, in a brushless motor with small inertia, the deceleration increases and the time interval of the third and fourth signals SL3 and SL4 is greater than the time interval of the second and third signals SL2 and SL3. In this case, the acceleration may be calculated from the change in the time interval, and the excitation energization timing may be computed by estimating the next time interval by using this acceleration.

Figure 9:
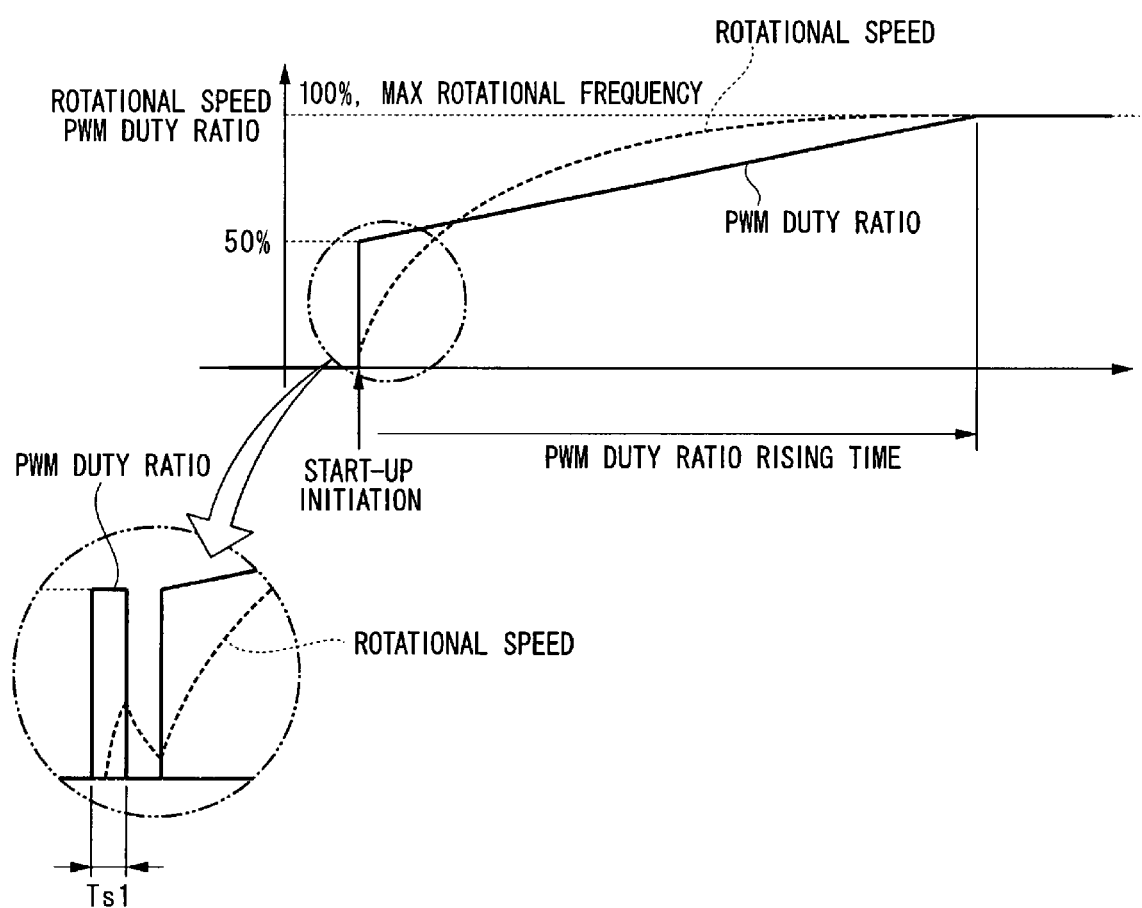
FIG. 9 is a drawing showing the duty ratio control and rotational speed in the case of performing a soft start.

Moreover, this start-up method carries out a method of starting while restricting current during motor start-up (hereinafter referred to as "soft start"). For example, as shown in FIG. 9, during start-up, by setting the duty ratio of the pulse width modulation signal (PWM) to 50% the current is restricted. Thereafter, the rotational speed is increased, and after the initial energization time Ts1 has elapsed, the duty ratio is set to 0% and the rotor is allowed to coast. When the coasting has finished, the duty ratio is again set to 50% and thereafter gradually increased. When the duty ratio eventually reaches 100%, the rotational speed is made to reach a targeted value (for example, the maximum rotational frequency). Thereby, it is possible to prevent overcurrent from flowing during start-up, and it is possible to increase the stability of the entire system in which the brushless motor 1 is mounted.

Sensorless driving by induced voltage of step S109 (steady driving mode) shall now be described in detail.

In the steady driving mode, the rotor position is detected by detecting the induced voltage of the motor terminal. However, since a square-wave switching pulse (square-wave pulse voltage) overlaps the induced voltage waveform, it is necessary to remove such noise. In this embodiment, when the edge corresponding to the rotor position signal of each phase has been detected, the rotor position signal and the square-wave pulse voltage are distinguished by performing level detection of other phases. The forward rotation specific logic that is used at this time are formed of induced voltage signal detection logic shown in Table 1 and square-wave pulse voltage ending edge determination logic shown in Table 2.

Note that the separating device 21 refers to the forward rotation specific logic by the instruction of the rotational direction detection logic selection device 24 in the case of the rotational direction determining device 23 shown in FIG. 1 determining that the brushless motor 1 is rotating in forward.

TABLE 1

| DETECTED EDGE | | CONFIRMED LEVEL | |
|---|---|---|---|
| | Ud | Vd | Wd |
| RISING EDGE Ud | | L | H |
| Vd | H | | L |
| Wd | L | H | |
| FALLING EDGE Ud | | H | L |
| Vd | L | | H |
| Wd | H | L | |

TABLE 2

| DETECTED EDGE | | CONFIRMED LEVEL | |
|---|---|---|---|
| | Ud | Vd | Wd |
| RISING EDGE Ud | | H | L |
| Vd | L | | H |
| Wd | H | L | |
| FALLING EDGE Ud | | L | H |
| Vd | H | | L |
| Wd | L | H | |

Figure 10:
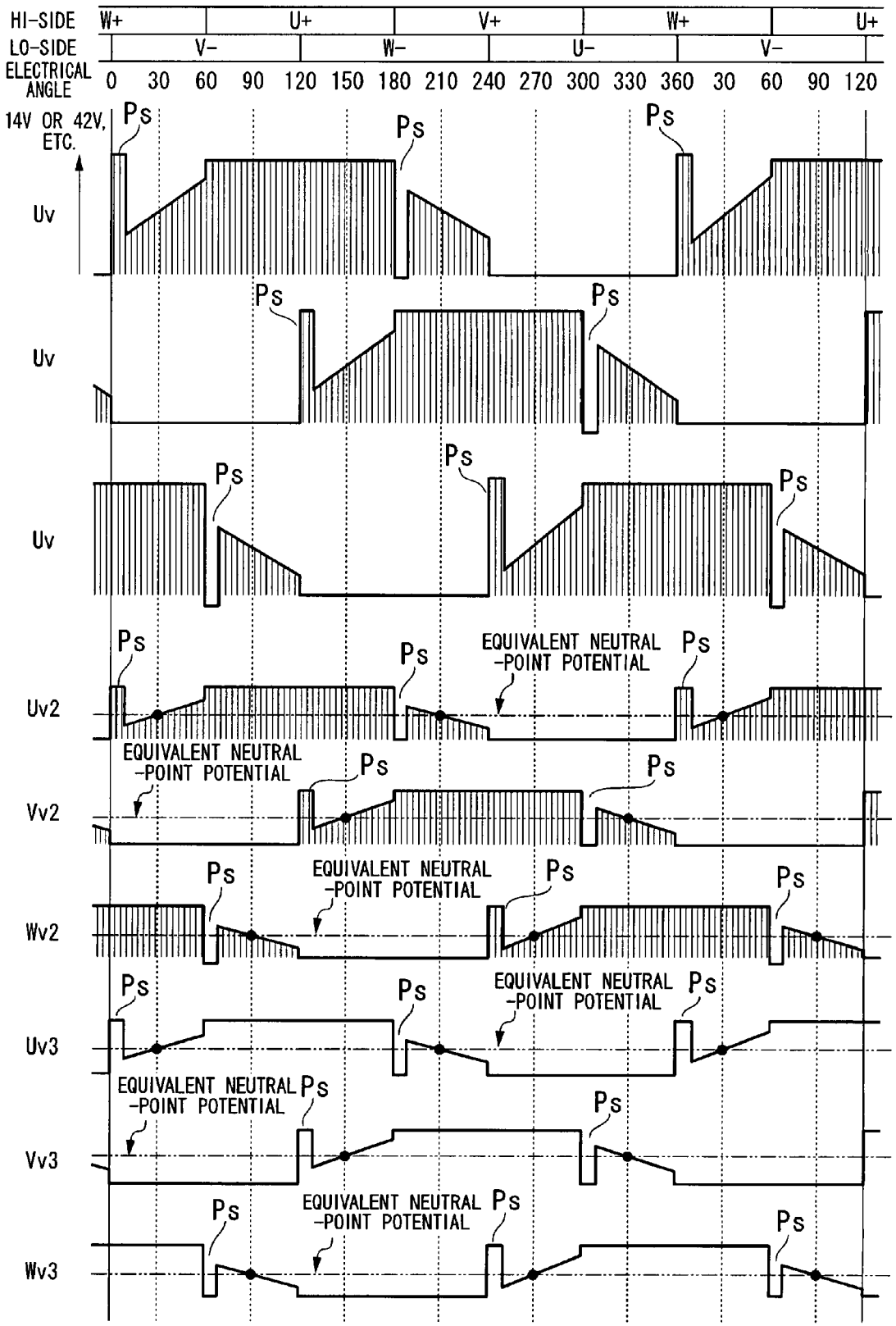
FIG. 10 is a timing chart describing the signal processing of induced voltage waveforms of the stator windings, showing the procedure of creating a digital signal from an analog signal.

FIG. 10 shows the signal waveforms when performing energization control in the steady driving mode. In FIG. 10, the horizontal axis represents the electrical angle, while the vertical axis represents, from the top downward, the state of energization to the stator windings U, V, W; the actual induced voltage waveforms Uv, Vv, Wv (analog signals) of the stator windings U, V, W; and the induced voltage signals Ud, Vd, Wd (digital signals) of the stator windings U, V, W. The state of energization to each of the stator windings U, V, W at the top level shows that the stator windings U, V, W marked with "+" on the upper side are in the high potential side, while the stator windings U, V, W marked with "−" on the lower side are in the low potential side. That is, the "W+" and the "V−" from 0 degree to 60 degrees electrical angle shows the energization from the stator winding W to the stator winding V (equivalent to energization pattern No. 6 in FIG. 5). Also, for example, in the induced voltage waveform Uv, the rising pulse at 0 degree electrical angle and the falling pulse at 180 degrees electrical angle are square-wave pulse voltages Ps, and these square-wave pulse voltages Ps are signals to be removed in this embodiment.

Figure 11:
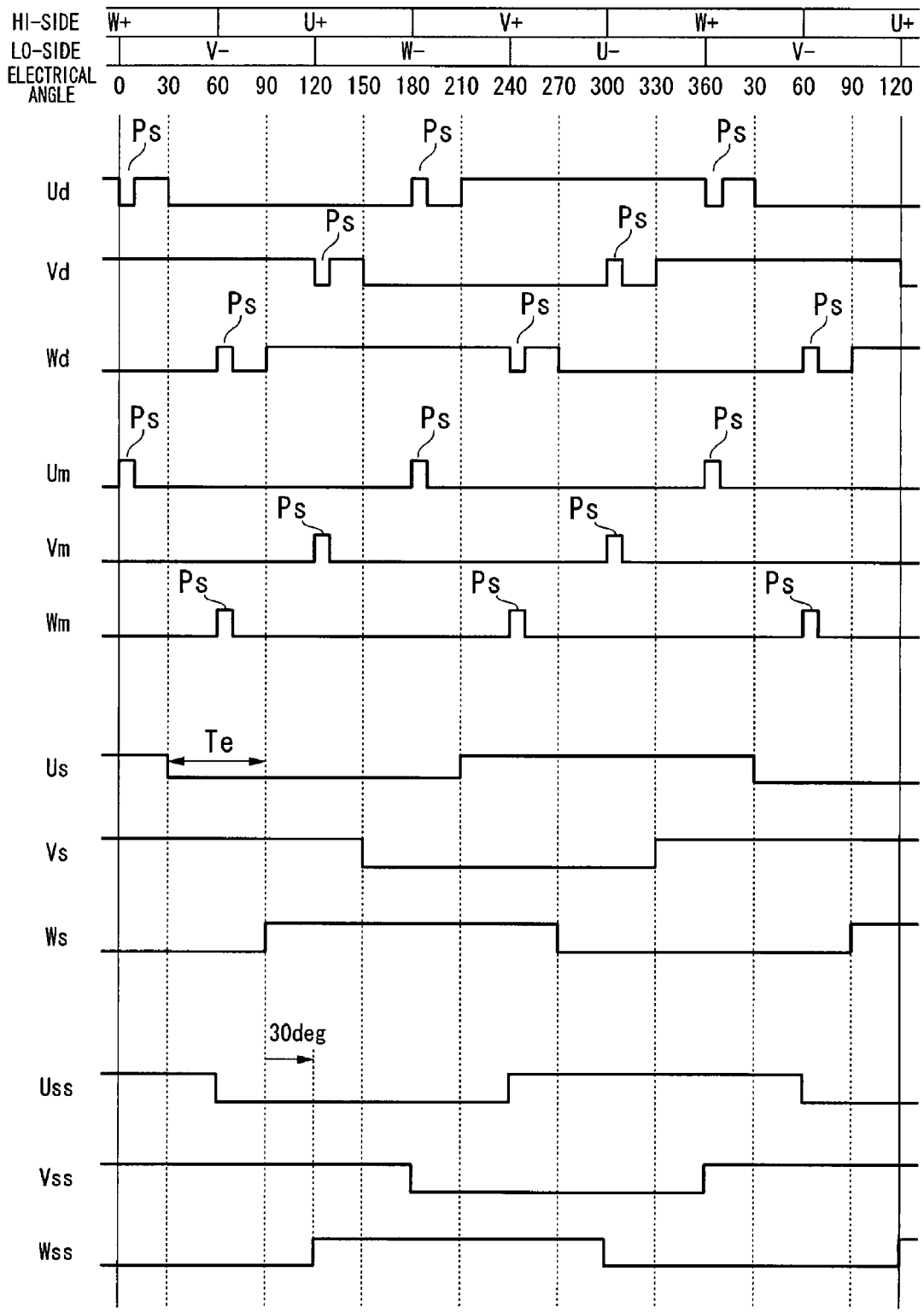
FIG. 11 is a timing chart describing the signal processing of induced voltage waveforms of the stator windings, showing the mask signal creation procedure and the position detection signal creation procedure after the mask processing.

Also, FIG. 11 schematically shows the mask signal generation process and the position detection signal generation process. The horizontal axis of FIG. 11 represents the electrical angle, while the vertical axis represents, from the top downward, the induced voltage signals Ud, Vd, Wd (the same signals as those in FIG. 10) of the stator windings U, V, W; the position detection signals Us, Vs, Ws of the stator windings U, V, W; the position detection signals Uss, Vss, Wss after a 30 degrees electrical angle phase shift; and the square-wave pulse voltage signal Um of the stator winding U, the square-wave pulse voltage signal Vm of the stator winding V, and the square-wave pulse voltage signal Wm of the stator winding W.

The induced voltage waveforms Uv, Vv, Wv of the stator windings U, V, W shown in FIG. 10 are input to the induced voltage I/F circuit 12 (refer to FIG. 1) and divided into voltages Uv2, Vv2, Wv2 that can be input to the comparators 17A to 17C by the voltage dividing circuit of the low-pass filter circuits 15A to 15C. Thereafter, induced voltage signals Uv3, Vv3, Wv3 are generated following removal of PWM noise by the low-pass filter circuits 18A to 18C, with the equivalent neutral point voltage being obtained from these voltage values. By inputting this equivalent neutral point voltage and the induced voltage waveform Uv3 to the comparator, the induced voltage signal Ud is obtained. Similarly, the induced voltage signals Vd and Wd, which are digital signals, are obtained from the induced voltage waveforms Vv3 and Wv3, which are analog signals. These induced voltage signals Ud, Vd, Wd are input to the separating device 21 of the control unit 11, and the energizing switch timing is generated by the following process.

The separating device 21 separates the edge of the square-wave pulse voltage Ps and the edge of the induced voltage generated by rotation of the rotor 41 from the pulse signals of the induced voltage signals Ud, Vd, Wd. The rotational direction determining device 23 creates the position detection signals Us, Vs, Ws that are formed of information of the induced voltage generated by rotation of the rotor 41 and delivers it to the excitation switch timing calculating device 22. The excitation switch timing calculating device 22 counts the interval Te of the edges (induced voltage edge) of the position detection signals Us, Vs, Ws shown in FIG. 11. Specifically, measurement by the counter is started with all of the edges of the position detection signals Us, Vs, Ws as triggers. Next, the count value is cleared when the edge of any of the position detection signals Us, Vs, Ws is detected, and simultaneously the next count is started. Here, when the brushless motor 1 is rotating, an interval Te of the induced voltage edge is generated every 60 degrees electrical angle. Therefore, the rotational speed and the acceleration of the rotor 41 are calculated from the count value that shows the generated interval of the induced voltage. Next, the energization switch timing is accordingly corrected, and the phases of the position detection signals Us, Vs, Ws are shifted by that much to generate the phase detection signals Uss, Vss, Wss. The excitation voltage output device 27 controls the inverter 13 in accordance with these phase detection signals Uss, Vss, Wss, and rotates the rotor 41 of the brushless motor 1 by switching the energization to each of the stator windings U, V, W.

Here, the excitation voltage output device 27 is provided with a mask signal generation device 27A. This mask signal generation device 27A outputs a mask signal to the separating device 21 immediately before the excitation voltage output device 27 outputs the energization pattern to the inverter.

For example, in the example of FIG. 11, the mask signal Wm of the stator winding W is set to H (High) level immediately before a timing when an edge of the position detection signal Uss of the stator winding U is generated. Similarly, the mask signal Um of the stator winding U is set to H (High) level immediately before a timing when an edge of the position detection signal Vss of the stator winding V is generated. The mask signal Vm of the stator winding V is set to H (High) level immediately before a timing when an edge of the position detection signal Wss of the stator winding W is generated. The signal levels of each of the mask signals Um, Vm, Wm are maintained for the predetermined electrical angle, and then changed to L (Low) level.

Note that as for the electrical angle that determines the pulse width of the mask signals Um, Vm, Wm, an angle that is stored in advance is always calculated from the measured value of Te. Specifically, a value greater that 0 degree and less than 30 degrees is used that is greater than the pulse width of the square-wave pulse voltage Ps when rotated by an ordinary load and that ensures that the intersection of the induced voltage waveforms Uv, Vv, Wv and the equivalent neutral point voltage is not masked by the pulse of the mask signal.

Thereafter, with respect to the induced voltage signals Ud, Vd, Wd that are input from the induced voltage I/F circuit 12, the pulse of the square-wave pulse voltage Ps is removed by the mask signals Um, Vm, Wm to create the position detection signals Us, Vs, Ws, and energization control of the brushless motor 1 is performed.

Here, the pulse width of the square-wave pulse voltage Ps changes depending on the size of the load and the rotational speed. In contrast to this, since the mask signals Um, Vm, Wm are fixed pulse widths, cases arise in which the pulse of the square-wave pulse voltage Ps can be completely masked by the mask signals Um, Vm, Wm and cases in which it cannot be completely masked.

Figure 12:
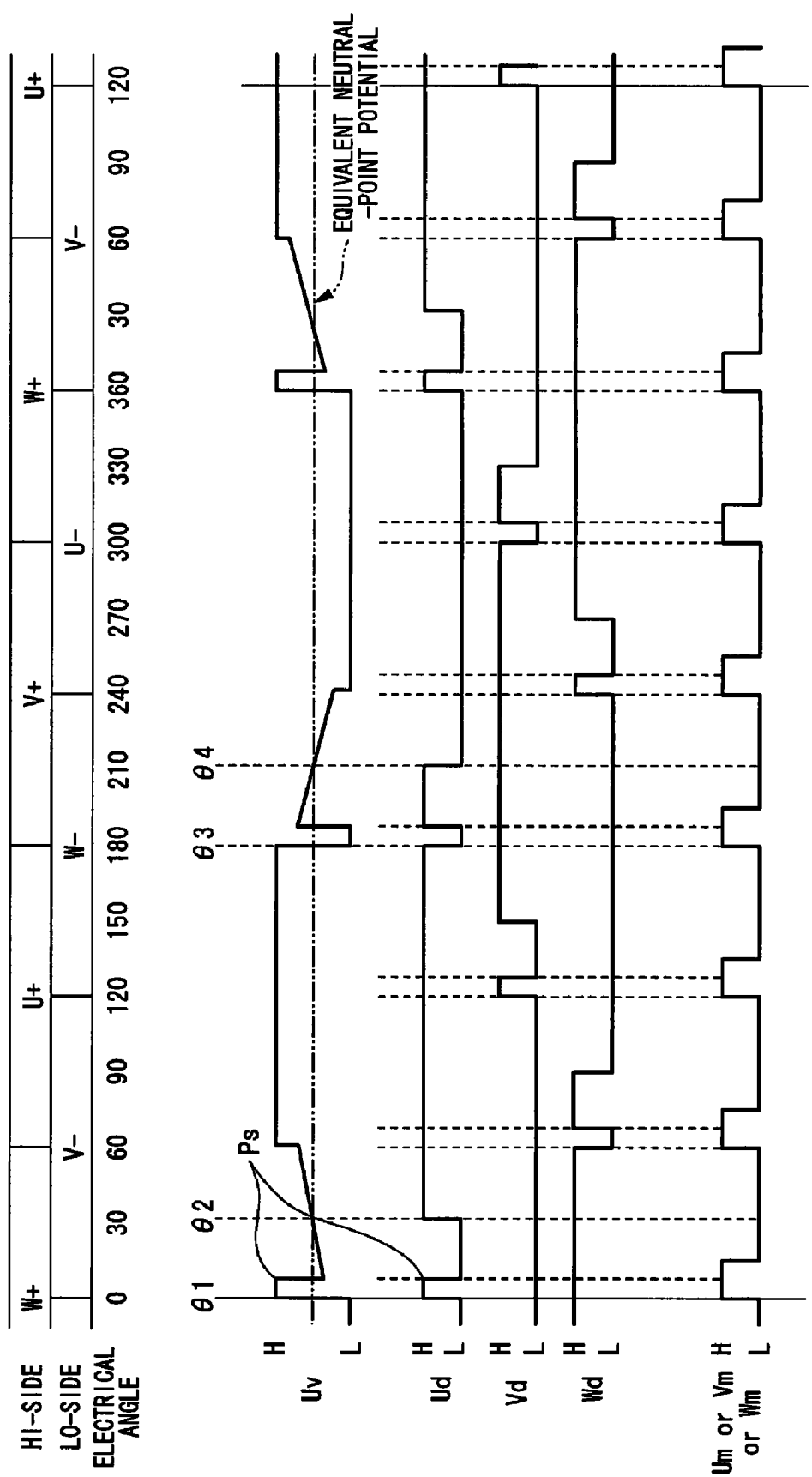
FIG. 12 is a timing chart for describing the induced voltage edge determination process, showing the case of the pulse width of the square-wave pulse voltage being less than or equal to the pulse width of the mask signal.

First, when the pulse width of the square-wave pulse voltage Ps is less than or equal to the mask width, as shown in FIG. 12, both the starting edge and ending edge of the square-wave pulse voltage Ps can be masked. In this case, the separating device 21 creates the position detection signals Us, Vs, Ws from the induced voltage signals Ud, Vd, Wd in accordance with the induced voltage signal detection logic as shown in Table 1.

In FIG. 12, the rising edge and the falling edge of the square-wave pulse voltage Ps that starts from the electrical angle $\theta 1$ are ignored since the mask signal Um is at the H level. Since the rising edge at the electrical angle $\theta 2$ satisfies the condition for the induced voltage signal Ud of the rising edge of Table 1, it is regarded as the rising edge of the induced voltage of the stator winding U. Similarly, the falling edge and the rising edge of the square-wave pulse voltage Ps that starts from the electrical angle $\theta 3$ are ignored since the mask signal Um is at the H level. Since the falling edge of the induced voltage signal Ud at the electrical angle $\theta 4$ satisfies the condition for the induced voltage signal Ud of the falling edge of Table 1, it is regarded as the falling edge of the induced voltage of the stator winding U. Similarly, the other induced voltage signals Vd, Wd are judged to be rising and falling edges of the induced voltage in accordance with the induced voltage signal detection logic of Table 1, and the position detection signals Us, Vs, Ws are created.

Figure 13:
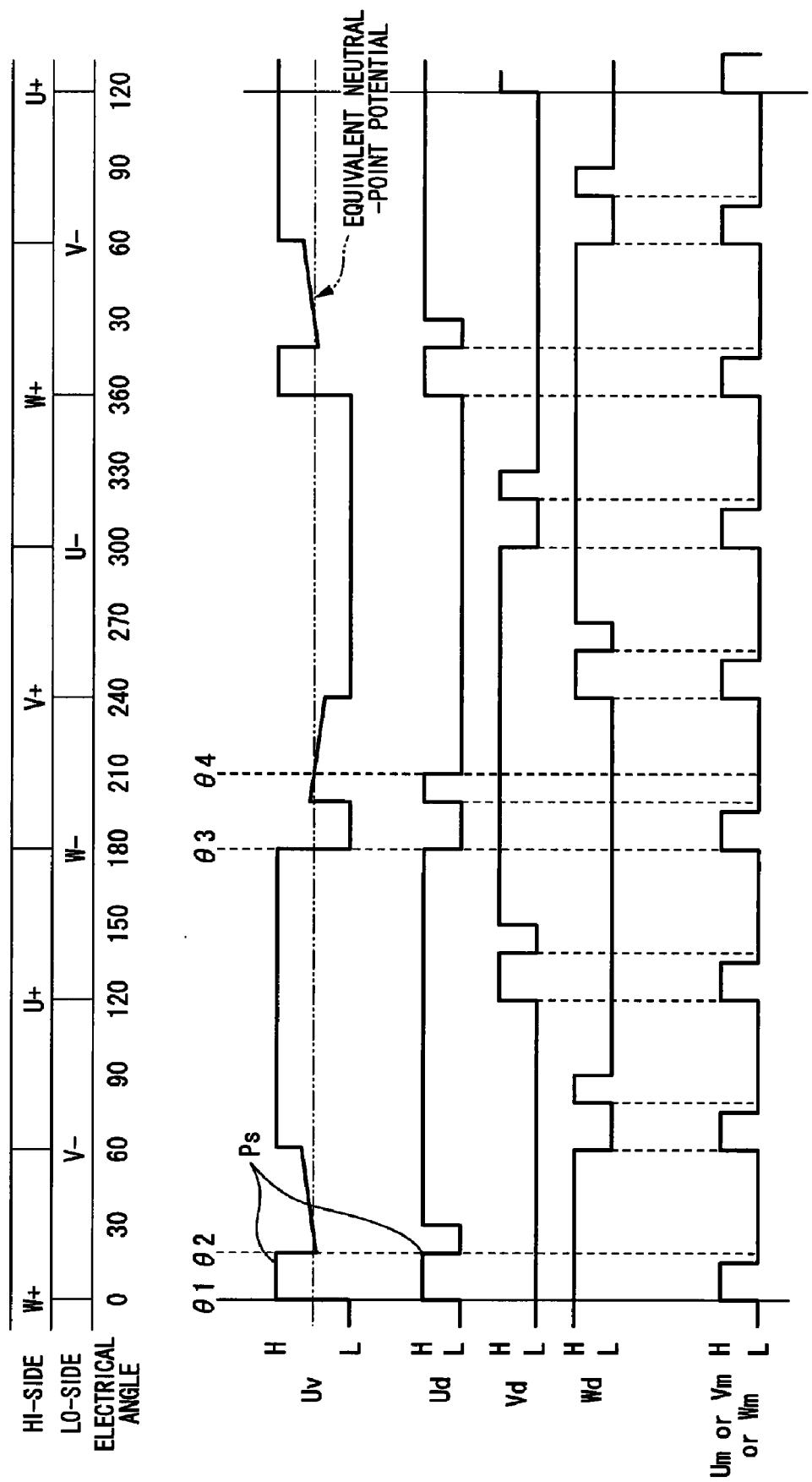
FIG. 13 is a timing chart for describing the induced voltage edge determination process, showing the case of the pulse width of the square-wave pulse voltage exceeding the pulse width of the mask signal.

In contrast, as shown in FIG. 13, when the pulse width of the square-wave pulse voltage Ps exceeds the mask width, the starting edge of the square-wave pulse voltage Ps can be masked, but the ending edge of the square-wave pulse voltage Ps cannot be masked. In such a case, the separating device 21 separates the induced voltage edge and creates the position detection signals Us, Vs, Ws referring to the square-wave pulse voltage ending edge determination logic as shown in Table 2, in addition to the induced voltage signal detection logic as shown in Table 1.

In FIG. 13, the rising edge of the square-wave pulse voltage Ps that starts from the electrical angle $\theta 1$ is masked, but the falling edge of the same square-wave pulse voltage Ps cannot be masked. Therefore, whether or not the conditions of the falling edge shown in Table 1 and Table 2 are satisfied is checked. In this case, since the condition for the induced voltage signal Ud of the falling edge in Table 2 is satisfied, it is regarded as the edge of the square-wave pulse voltage Ps, and after removing this signal the position detection signal Us is created. Since the edge of the electrical angle $\theta 2$ satisfies the condition of the Table 1 as mentioned above, it is regarded as the induced voltage edge. Similarly, the falling edge of the square-wave pulse voltage Ps that starts from the electrical angle $\theta 3$ is removed by the mask signal Um, and since the rising edge of the same square-wave pulse voltage Ps satisfies the condition for the induced voltage signal Ud of the rising edge of Table 2 it is removed. By doing so, in the case where there is a pulse of the square-wave pulse voltage Ps that cannot be removed by the mask signal Um, the necessity of removing it is determined by investigating the heights of the voltage levels of the other induced voltage signals Vd and Wd and applying to the conditions of Table 1 and Table 2, and by removing the signal by the square-wave pulse voltage Ps, the position detection signal Us is created. Moreover, similarly the position detection signals Vs and Ws are created.

Figure 14:
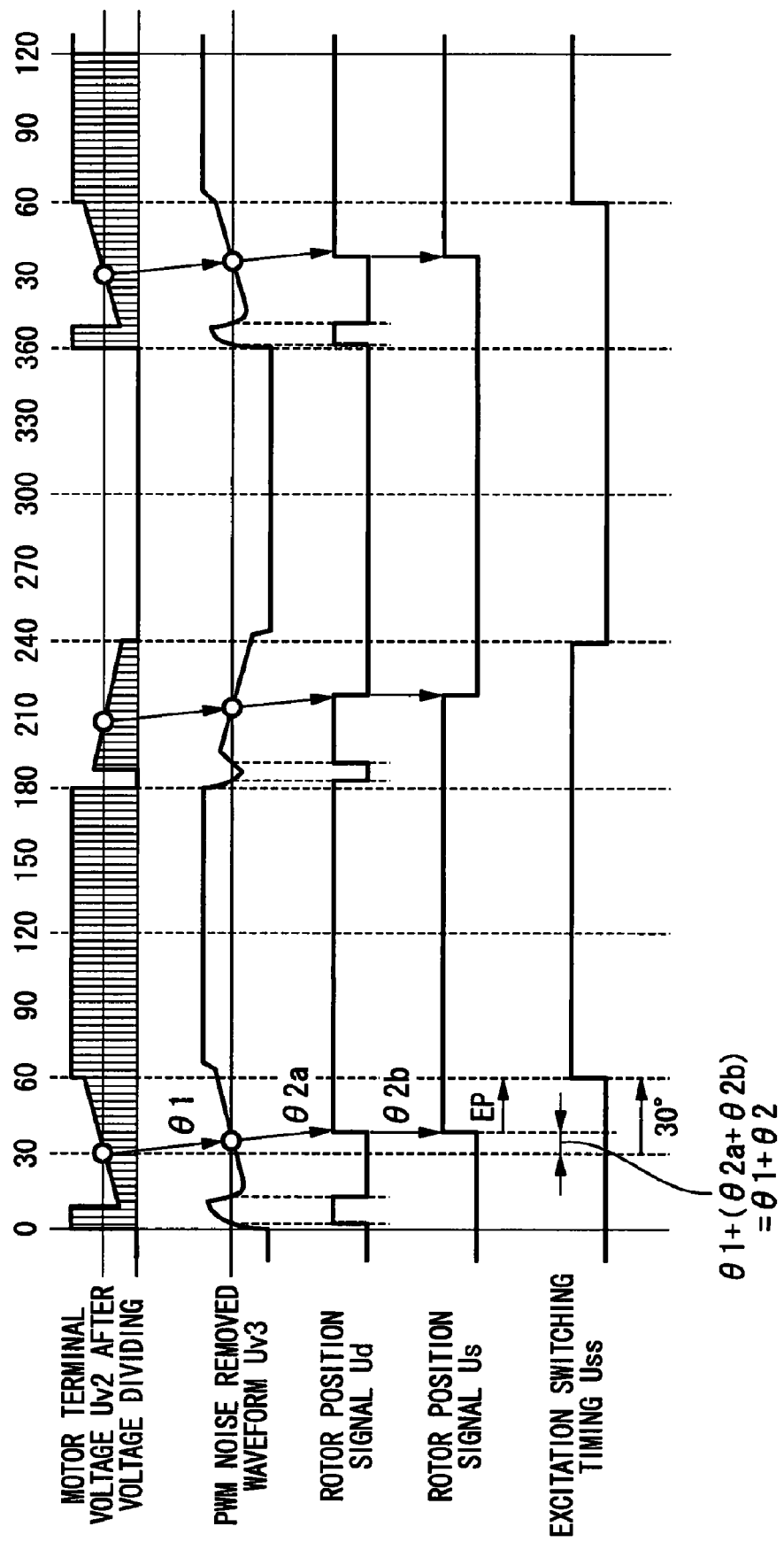
FIG. 14 is a drawing showing the U-phase excitation timing.

Here, the process of correcting the timing of switching the energization when generating the phase detection signals Uss, Vss, Wss shall be described. The correction is performed by the delay phase correction portion 22A provided in the excitation switch timing calculating device 22. FIG. 14 shows the delay phase that is to be corrected. FIG. 14 schematically shows the excitation timing and the delay phases $\theta 1$, $\theta 2$ in the U phase. The delay phase $\theta 1$ changes in accordance with the rotational speed resulting from the low-pass filter circuits 15A to 15C of the induced voltage I/F circuit 12. The delay phase $\theta 2$ is the sum of the delay component $\theta 2a$ due to the induced voltage I/F circuit 12 from the comparators 17A to 17C onward, that is, the delay component in accordance with the comparators 17A to 17C and the low-pass filters 18A to 18C, and the process delay time $\theta 2b$ of the microcomputer of the control unit 11 ($\theta 2 = \theta 2a + \theta 2b$), and is a value characteristic to the driving device 2. Accordingly, the delay phase correction portion 22A functions as a filter delay phase correction device that corrects the delay phase $\theta 1$ and a circuit delay phase correction device that corrects the delay phase $\theta 2$.

First, the process of the delay phase correction portion 22A as a filter delay phase correction device shall be described.

Figure 15:
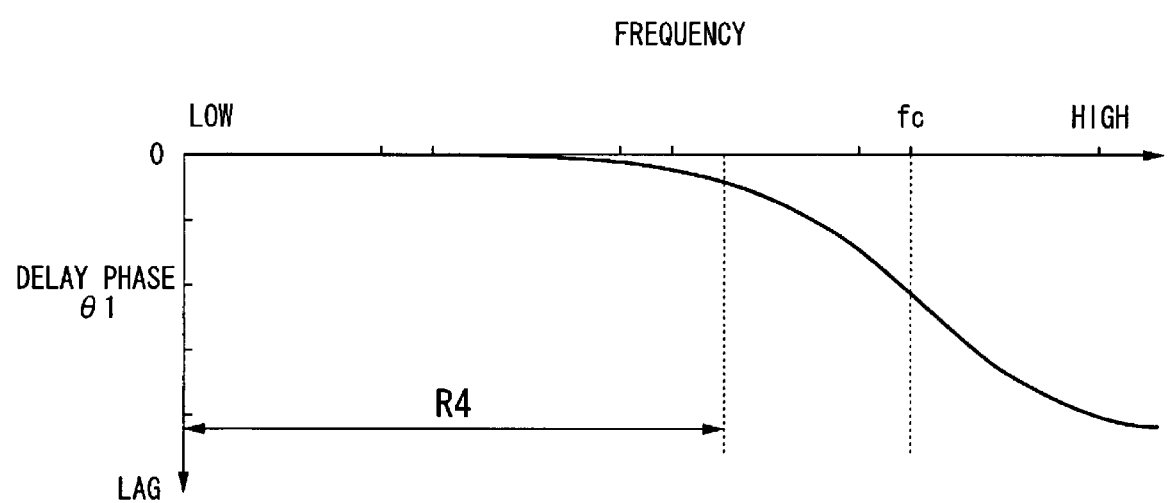
FIG. 15 is a graph showing the delay phase of the motor terminal voltage waveform with respect to frequency.

In the case that the range R4 shown in FIG. 15 is the control range of the rotational speed of the brushless motor 1, for the low-pass filter circuits 15A to 15C, a cut-off frequency fc is set in a frequency domain higher than the range R4. FIG. 15 is a Bode plot in which the horizontal axis shows a logarithmic frequency and the vertical axis shows phase. The delay phase $\theta 1$ occurs in the induced voltage signal that passes through the low-pass filter circuits 15A to 15C of the cut-off frequency fc. The delay phase θ1 increases as the frequency increases.

The transfer function G(s) of the low-pass filter circuits 15A to 15C is expressed by the following equation using τ(=C×R).

$$G(s)=1/(\tau s+1) \quad (1)$$

From equation (1), the delay phase θ1[rad] is written as follows.

$$\theta 1=-\arctan(\omega\tau) \quad (2)$$

Here, since the angular acceleration ω can be expressed as a function of the fundamental frequency of the motor terminal voltage corresponding to the rotational speed, equation (3) is expressed as follows.

$$\theta 1=-\arctan(2\pi\tau\times f) \quad (3)$$

Converting the unit to degrees and regarding it as delay gives the following.

$$\theta 1=\arctan(2\pi\tau\times f)\times 360/2\pi \quad (4)$$

By letting the time required for 60 degrees electrical angle of rotation be Ta, 1/f=6Ta, leading to $$\theta 1=\arctan(2\pi\tau/6Ta)\times 360/2\pi \quad (5)$$

The delay phase θ1 due to the filter circuits 15A to 15C can be calculated by equation (5). While the delay phase θ1 may be calculated each time from equation (5), in this embodiment, it is map registered in the delay phase correction portion 22A, so that the delay phase θ1 is obtained by searching by time Ta.

Next, the process of the delay phase correction portion 22A as the circuit delay phase correction device shall be described.

The delay phase θ2 is generated by other circuits other than the filter circuits 15A to 15C and software processing. This delay phase θ2 occurs as a result of the comparators 17A to 17C, the low-pass filter circuits 18A to 18C, microcomputers, and the like. The delay time T2 at this time is a fixed value that does not depend on the rotational speed. Accordingly, it is possible to calculate the delay phase θ2 from the ratio of the delay time T2 to the time Ta required for a 60 degrees electrical angle rotation.

$$\theta 2=(T2/Ta)\times 60° \quad (6)$$

From equation (6), since the delay time T2 is fixed, when the rotational speed increases and the time Ta shortens, the value of T2/Ta increases, and the delay phase θ2 increases. Note that mapping equation (6) also allows the calculation to be smoothly performed.

From the above, the timing Ew of switching the excitation becomes $$Ew=30-(\theta 1+\theta 2) \quad (7)$$

By correcting the timing Ew using a map, the timing Ew can be quickly calculated. Moreover, by using the corrected timing Ew, the excitation can be accurately changed without relying on the rotational speed.

Next, the case in which the rotational speed is already in the region R2 during start-up shall be explained.

Figure 16:
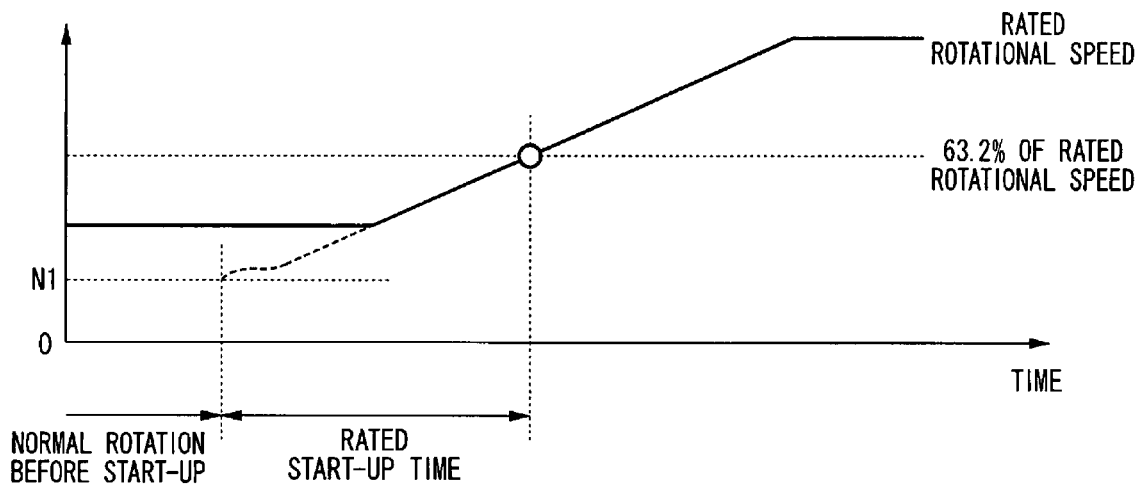
FIG. 16 is a timing chart when starting from the region R2 of FIG. 3.

As shown in FIG. 16, the state prior to start-up is the same as the aforedescribed coasting state. Even by performing step S103 to step S106 in accordance with the flowchart of FIG. 4, there is little effect on the coasting rotational state, so that the coasting state can be maintained. Accordingly, the process proceeds from step S108 to step S109, shifting to the steady driving mode.

The situation in which the rotational speed is in the region R3 during start-up shall be described.

Figure 4:
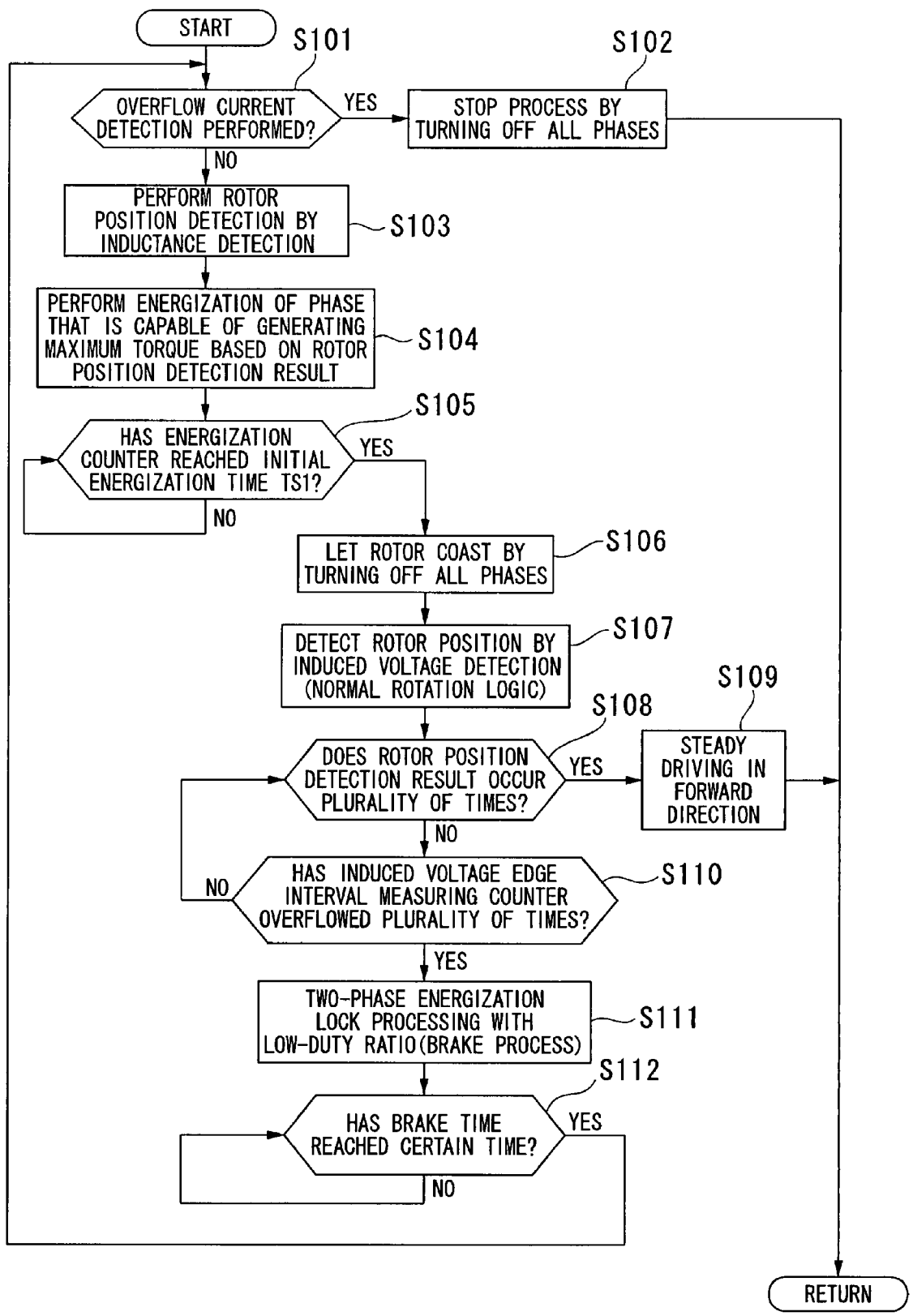
FIG. 4 is a flowchart that describes the outline of processing during start-up.

Even by performing step S101 to step S107 in FIG. 4, in the induced voltage waveform of the rotor 41 that is rotating in reverse, the rotor position signal cannot be extracted by the forward rotation specific logic.

Accordingly, when the rotor position signal cannot be detected during a predetermined time of, for example, 1 to 9 seconds (corresponding to step S110), the rotational direction determining device 23 determines that the rotor 41 is in a state of reverse rotation.

Figure 17:
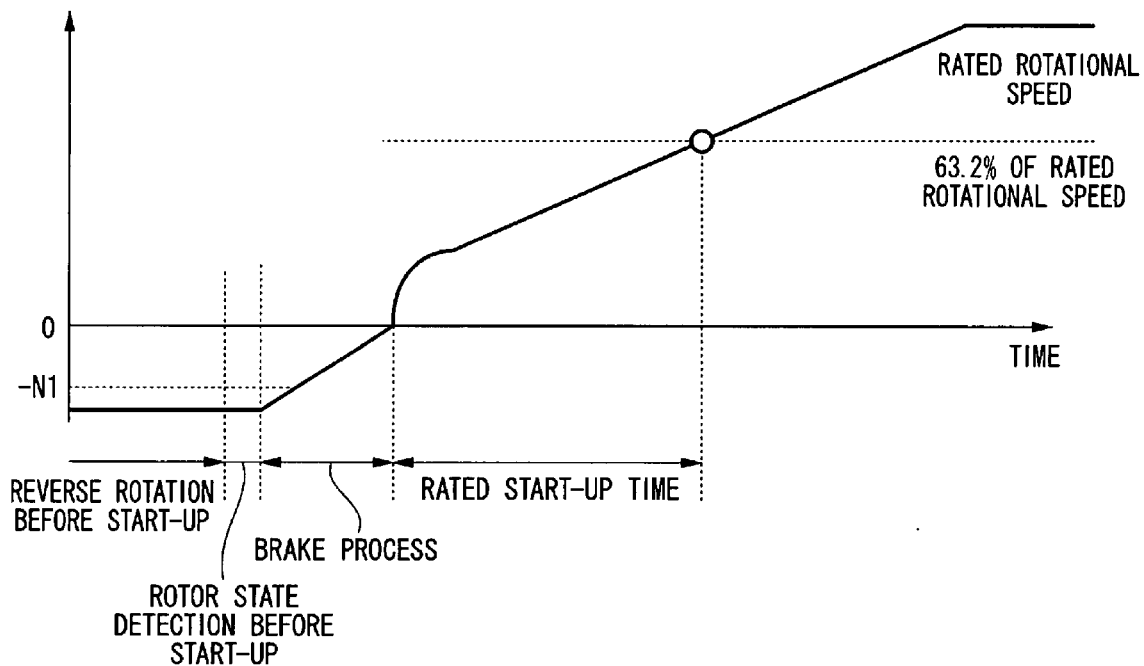
FIG. 17 is a timing chart when starting from the region R3 of FIG. 3.

In this case, the control unit 11 shown in FIG. 1 makes the brake stopping device 25 impresses a two-phase lock energization to the brushless motor 1 for a certain period of time at a low duty ratio that does not cause an overcurrent. This functions as a brake to the radiator fan, with the rotational speed of the radiator fan decreased to approach close to stopped state. As shown in FIG. 17, the time of continuing the two-phase lock energization is the preset brake energization time, being for example 1 to 9 seconds. Thereby, the rotational speed of the brushless motor 1 approaches from −N1 to near zero. As mentioned above, this is because while the radiator fan is rotating in reverse, the rotational frequency and torque are small.

When the brake energization time has elapsed, the start-up process is performed using the inductance detection. Since the radiator fan is a system with large friction, the mechanical time constant is large. When forcibly stopped during reverse rotation, since time is required before beginning to rotate in the reverse direction again with wind force, the rotational speed remains in the region R1. Subsequently, steps S103 to step S108 are performed and the transition is made to the steady driving mode.

According to the present embodiment, by performing two-phase energization, it is possible to investigate the size of the inductance from the square-wave pulse voltage width. The pulse width can thus be readily measured compared to the conventional case of measuring the voltage rising time, and there is no need to add special circuits. The device constitution can thus be simplified, and a reduction in the manufacturing cost can be achieved.

In the case of the magnetic flux produced by the coil and the magnetic flux produced by the magnet being in the same direction, that is, at a rotor position in which the magnetic flux flows readily between the coil and the magnet, the inductance becomes small. Given this fact, the rotor stop position can be detected with greater accuracy and stability compared to conventional methods.

By using a sequence of excitation patterns that generate square-wave pulse voltages, that is, a switching sequence of executing excitation patterns that perform non-energization when changing from N-pole magnetization to S-pole magnetization in the rotor stop position searching sequence, it is possible to improve the detection accuracy of detecting inductance by hindering the influence of residual magnetization of the iron core around which the coil winds.

Note that the rotor position estimating device 31 may investigate the maximum value instead of investigating the minimum value of the square-wave pulse voltage width. In this case, the square-wave pulse voltage width detecting device 29 stores the largest pulse width in the storage device 29A in association with the excitation pattern at that time. The start-up excitation device 36 starts up the brushless motor 1 by selecting with the start-up excitation device 36 the energization pattern that lags by 60 degrees in the rotational direction from the excitation pattern that provides the maximum value of the pulse width. For example, in the example shown in FIG. 5, since the excitation pattern No. 3 is the one in which the flow of the magnetic flux is most hindered and the square-wave pulse voltage width is the largest, the previous excitation pattern No. 2 is decided as the start-up excitation pattern.

Also, the square-wave pulse voltage widths may be measured a plurality of times each. For example, the case of measuring two times each will be explained referring to FIG. 18. In the stop position inspection of this case, energization control is performed with 24 steps from 0 to 23 as one set, and the stop position is estimated with step 24 that is the 25th step. In step 0 and step 1, after energization with the excitation pattern No. 1 and being released, the pulse width of the square-wave pulse voltage that is generated in the W phase are counted. In steps 2 and 3, the same process as in steps 0 and 1 each is repeated. Steps 4 and 5 and steps 6 and 7 perform the same process for excitation pattern No. 2. Thereafter, until step 23, counting of the square-wave pulse voltage width is performed twice for each of the excitation patterns No. 3 to No. 6.

The square-wave pulse voltage width detecting device 29 stores all of the square-wave pulse voltage widths (count values) measured twice or only the square-wave pulse voltage widths (count value) measured on the second time in the storage device 29A in association with the excitation pattern at that time. The stop position estimating process of step 24 compares the size of the square-wave pulse voltage widths measured on the second time in the similar way as described above. The excitation pattern of a minimum square-wave pulse voltage width is then determined as the start-up excitation pattern.

By doing so, when the brushless motor 1 has a constitution that is easily influenced by the residual magnetization of the coil iron core, it is possible to further reduce the influence of the residual magnetization and therefore increase the accuracy of detecting the inductance.

Here, the stop position estimating process may calculate the average value of the square-wave pulse voltage widths (count values) measured a plurality of times for the same excitation pattern and compare the size of the average values in the manner described above. By performing the averaging process, it is possible to further improve the accuracy of detecting the inductance. Even in the case of acquiring the square-wave pulse voltage widths a plurality of times, the rotor stop position and start-up excitation pattern may be determined by checking the maximum value instead of the minimum value.

Also, in this embodiment, since a coasting state is created during start up of the brushless motor 1, it is possible in a state of no noise to perform position detection of the rotor 41 that starts to rotate in a state of all phases released. For this reason, the rotor position can be detected quickly and accurately.

The energization time until coasting (Ts1) is within a range in which reverse torque does not occur. Therefore, the rotor position can be correctly detected without the rotor 41 greatly decelerating during the coasting.

When using the second and subsequent signals SL2 to SL4 without using the first signal SL1 that occurs during the coasting, correct detection is possible even when a signal is generated due to the square-wave pulse voltage during the first signal.

Here, the brushless motor 1 is, for example, a fan motor or fuel pump motor, a motor with large inertia, a slotless motor without cogging torque, and a low-loss motor in which there is little loss due to friction or cogging torque or the like. In a slotless motor, since there is no slot core, the rotor stop position cannot be detected by inductance detection. However, since the inertia is extremely small, it is possible to easily attract the rotor to a predetermined rotational position by energization when detecting the stop position of the rotor. Therefore, it is acceptable to determine the stop position by such a method and then select an energization pattern in which the phase lags 120 degrees electrical angle from the stop position for the start-up energization pattern. In this way, the rotor stop position detection method and the start-up excitation pattern determination method can use various methods without being limited to a method based on inductance.

Also, according to this embodiment, when starting the brushless motor 1, even when the rotor 41 is rotating in reverse, detection of the rotor position is possible using the inductance of the coil by performing a brake process. By starting the brushless motor 1 from here, it is possible to quickly shift to steady driving by 120 degree energization. During non-energization of the brushless motor 1, by performing start-up control in accordance with whether the rotor 41 is in a state of rotating forward or rotating in reverse due to the effects of wind or the like, or is in a stopped state, it is possible to reliably set the brushless motor 1 into motion. For example, in the case of using the brushless motor 1 for driving of a radiator fan in an engine cooling system for an automobile and the like, it is possible to improve the reliability of the system.

Second Embodiment

This embodiment uses reverse rotation specific logic in addition to forward rotation specific logic. The constitution of the apparatus is identical to that of the first embodiment.

Figure 19:
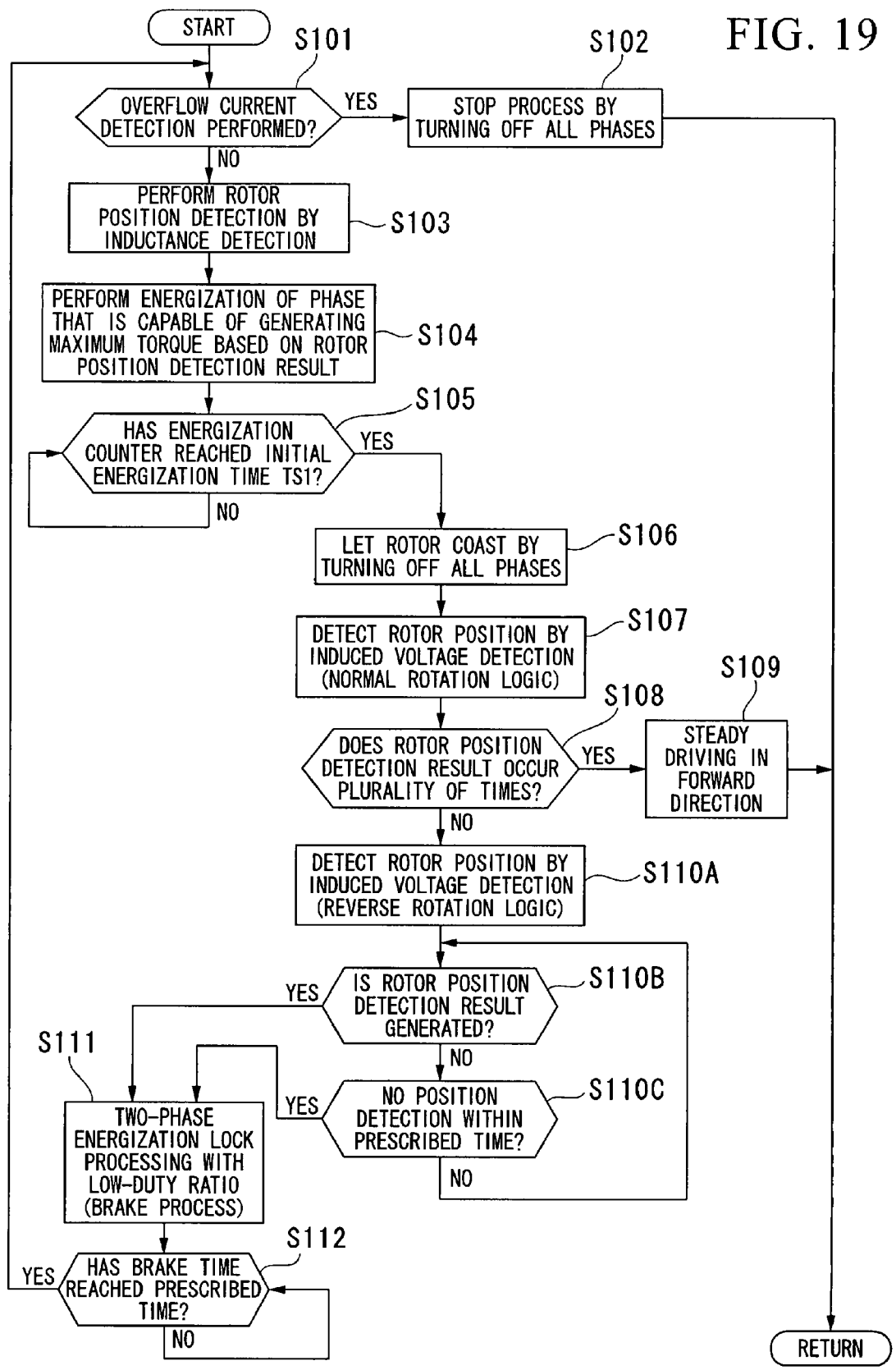
FIG. 19 is a flowchart describing the outline of processing during start-up.

FIG. 19 is a flowchart of operation during start-up. In the flowchart, the processing from step S101 to step S108, that is, the processing when the rotational speed of the brushless motor 1 during start-up initiation is in region R1 or region R2 of FIG. 3, is identical to the first embodiment. When the rotational speed during start-up is in region R3, the processing proceeds from step S108 to step S110A.

In step S110A, the rotor position is detected by detecting the induced voltage using the reverse rotation specific logic. The reverse rotation specific logic is selected by the rotational direction detection logic selection device 24 in the case of the rotational direction determining device 23 determining that the brushless motor 1 is rotating in reverse. The reverse rotation specific logic is formed of the induced voltage signal detection logic as shown in Table 2 and the square-wave pulse voltage ending edge determination logic as shown in Table 1 and is registered in the separating device 21. This reverse rotation specific logic is employed, and when the edge corresponding to the rotor position signal of each phase is detected, level detection of the other phases is performed to distinguish between the rotor position signal and the switching pulse, and the rotor position is detected. The process here is identical to the steady driving mode in the first embodiment, other than using a different logic.

When the rotor position detection process is performed and the rotor position detection signal has actually been obtained ("Yes" in step S110B), the processing from step S111 onward is carried out. Since it is only necessary to confirm rotating in reverse, the rotor position detection signal may be generated at least once. The processing from step S111 onward is the same as in the first embodiment.

In contrast, when the rotor position detection signal is not obtained ("No" in step S110B), after standing by for a certain time ("Yes" in step S110C), the processing proceeds to step S111.

In this embodiment, it is possible to reliably detect that the rotor is in a reverse rotational state by using reverse rotation specific logic. Other effects are identical to the first embodiment.

Third Embodiment

This embodiment initially performs a brake process.

Figure 20:
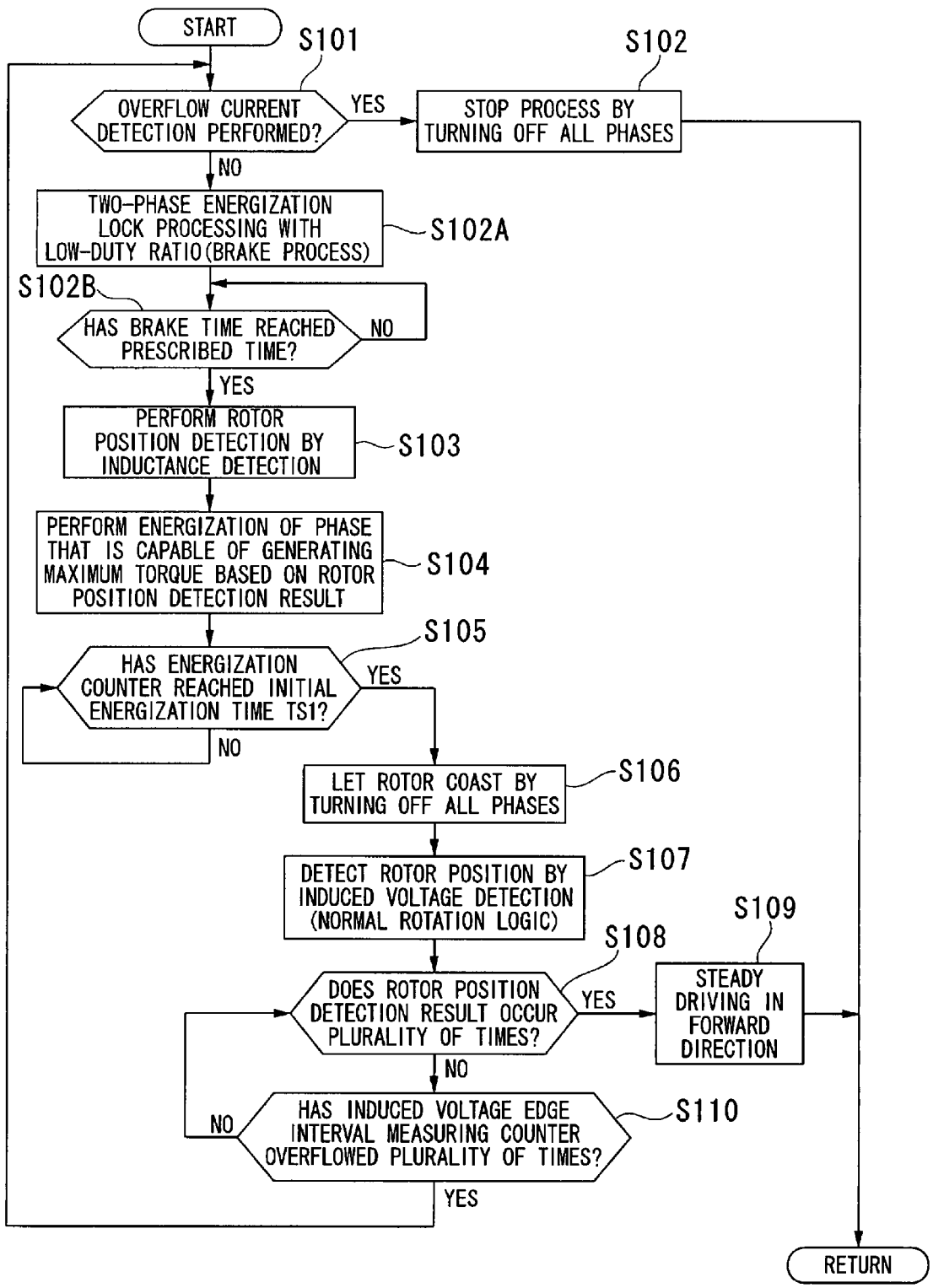
FIG. 20 is a flowchart describing the outline of processing during start-up.

As shown in FIG. 20, after the overflow current detection process is performed (step S101), a two-phase energization lock process is performed at a low duty ratio (step S102A). The brake time is a prescribed time (step S102B). These processes are processes that correspond to steps S111 and S112 in the first embodiment. During start-up, even when the rotational speed of the brushless motor 1 is in any of regions R1 to R3; it is forcibly controlled to region R1 by the brake process. The subsequent processes are the same as the first embodiment.

Figure 21:
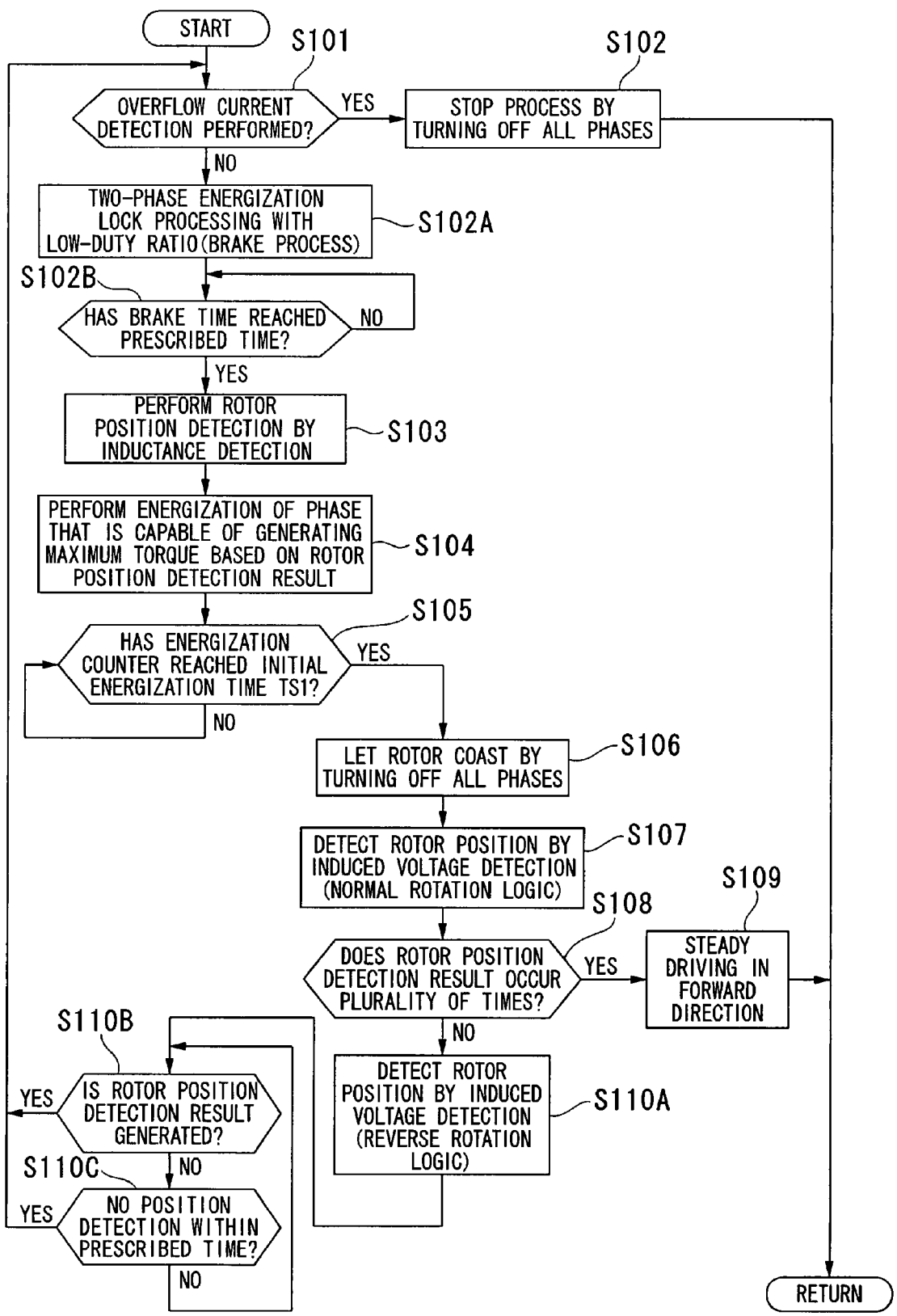
FIG. 21 is a flowchart describing the outline of processing during start-up.

Also, as shown in FIG. 21, even when using the reverse rotation specific logic (corresponding step S110A), by initially performing a brake process in steps S102A and S102B, even when the rotational speed of the brushless motor 1 is in any of regions R1 to R3, the rotational speed is forcibly controlled to region R1 by the brake process.

While preferred embodiments of the invention have been described and illustrated above, it should be understood that these are exemplary of the invention and are not to be considered as limiting.

For example, in the case of the terminal voltage fluctuating such as when the source voltage fluctuates, it is preferable to use a level conversion circuit instead of the voltage dividing circuit 14. The level conversion circuit uses a transistor, a field effect transistor (FET), and a comparator and the like, and is constituted so as to lower the terminal voltage in accordance with the source voltage.

The energization control during start-up monitors the current value from the shunt resistor 13A, and may control the value so as to remain below a predetermined value, and is not limited to a duty ratio of 50%.

The initial energizaton time Ts1 may be obtained by substituting predetermined physical constants in voltage/current equations and position/torque equations or may be determined by simulation.

Figure 22:
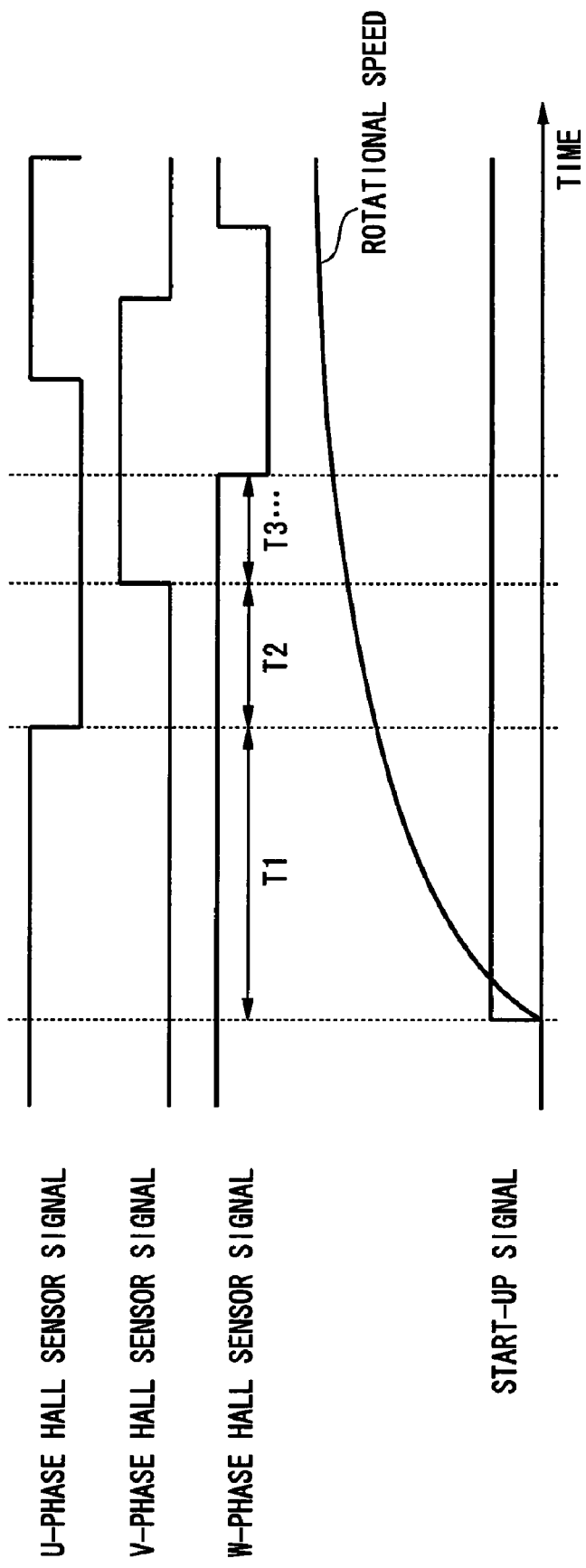
FIG. 22 is a drawing specifically showing the method of determining the initial energization time, and the method of determining the energization time when performing open-loop control for up to three times of energization switching.

When acceleration to a sufficient rotational speed for rotor position detection is not possible only with the initial energizaton time Ts1, sufficient acceleration may be achieved by performing a forced energization by a plurality of open loops before shifting to a coasting state. For example, as shown in FIG. 22, together with determining the first energization switch timing (initial energizaton time Ts1) using a Hall sensor, the second energization switch timing (energizaton time Ts2) and third energization switch timing (energizaton time Ts3) are measured, and these energization times Ts1 to Ts3 are stored in the control unit 11 as a program. During start-up, after continuing the start-up excitation pattern for only the initial energizaton time Ts1, the excitation pattern subsequent to the start-up energization pattern is continued for time Ts2, and moreover the next excitation pattern is continued for time Ts3. Afterward, the energization of all phases is turned OFF to let the rotor coast.

Note that in FIG. 7, when the brushless motor 1 was rotated in reverse during start-up, an excitation pattern leading by 120 degrees is chosen as the excitation pattern during start-up.

Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving device for a brushless motor, comprising:
an energization pattern determining device that, during startup of the brushless motor, energizes the brushless motor with an excitation pattern in accordance with a stop position of a rotor of the brushless motor for an initial energization time and then stops the energization to cause the rotor of the brushless motor to coast;
an excitation switch timing calculating device that determines an excitation timing by detecting the rotor position from an induced voltage that is generated at the motor terminals during coasting of the rotor, wherein the excitation switch timing calculating device calculates the excitation timing from a time interval between the second and subsequent induced voltage signals generated at the motor terminals during coasting of the rotor;
an excitation voltage output device that selects a plurality of excitation patterns that are capable of driving the brushless motor and energize with each excitation pattern in turn within a time range in which the rotor does not rotate;
a square-wave pulse voltage width detecting device that detects the pulse widths of a square-wave pulse voltage generated in a coil of the brushless motor when the excitation patterns are switched; and
a rotor position estimating device that obtains the minimum value or the maximum value from the pulse widths of each of the square-wave pulse voltages in the plurality of excitation patterns and determines the stop position of the rotor from the excitation pattern of the minimum value or maximum value;
wherein the driving device is constituted so as to output an energization pattern that leads or lags by a predetermined electrical angle from the stop position of the rotor determined by the rotor position estimating device as a start-up excitation pattern.

2. The driving device for a brushless motor according to claim 1, wherein
between an excitation pattern that N-pole magnetizes the coil and an excitation pattern that S-pole magnetizes the same coil, the excitation voltage output device performs an excitation pattern that does not energize a coil.

3. The driving device for a brushless motor according to claim 1 or claim 2, wherein when the rotor position estimating device has determined the stop position of the rotor from the minimum value of the pulse widths of the square-wave pulse voltages, an excitation pattern having a phase lag of 120 degrees is output during forward rotation and an excitation pattern having a phase lead of 120 degrees is output during reverse rotation.

4. The driving device for a brushless motor according to claim 1, wherein,
when the rotor is rotating in reverse, a low duty ratio voltage is impressed and the excitation voltage output device is run after a brake being applied to the rotor.

5. The driving device for a brushless motor according to claim 4, further comprising:
a filter that removes noise that is included in the detection signal of the terminal voltage in a device that detects the terminal voltage of each phase of the brushless motor, and
a filter delay phase correction device that corrects the delay phase of the filter that changes in accordance with the rotational speed of the brushless motor in the excitation switch timing calculating device.

6. The driving device for a brushless motor according to claim 5, wherein
the filter is a primary CR filter that removes noise that is generated when performing pulse width modulation control of the brushless motor.

7. The driving device for a brushless motor according to claim 6, wherein
the excitation switch timing calculating device further having a circuit delay phase correction device that corrects the delay phase due to circuits other than the filter.

8. A driving device for a brushless motor, comprising:
an energization pattern determining device that, during start-up of the brushless motor, energizes the brushless motor with an excitation pattern in accordance with a stop position of a rotor of the brushless motor for an initial energization time and then stops the energization to cause the rotor of the brushless motor to coast;
an excitation switch timing calculating device that determines an excitation timing by detecting the rotor position from an induced voltage that is generated at the motor terminals during coasting of the rotor, wherein the excitation switch timing calculating device calculates the excitation timing from a time interval between the second and subsequent induced voltage signals generated at the motor terminals during coasting of the rotor; and
a voltage dividing circuit that divides square-wave pulse voltages generated at the coils and inputs them to the square-wave pulse voltage width detecting device.

9. A method of detecting a stop position of a rotor of a brushless motor, comprising:
selecting a plurality of excitation patterns that are capable of driving the brushless motor;
selecting an energization sequence so that, between an excitation pattern that N-pole magnetizes the coil and an excitation pattern that S-pole magnetizes the same coil, an excitation pattern that does not energize a coil is energized;
energizing with each excitation pattern in turn within a time range in which the rotor does not rotate;
investigating the pulse width of a square-wave pulse voltage that is generated in a coil of the brushless motor when switching the excitation pattern;
determining the stop position of the rotor from the minimum value of pulse widths of square-wave pulse voltages generated in the coil of the brushless motor when switching the excitation pattern;
outputting an excitation pattern having a phase lag of 120 degrees from the rotor stop position during forward rotation; and
outputting an excitation pattern having a phase lead of 120 degrees from the rotor stop position during reverse rotation.

10. A method of starting a brushless motor, comprising when starting up a brushless motor:
selecting a plurality of excitation patterns that are capable of driving the brushless motor;
energizing with each excitation pattern in turn within a time range in which the rotor does not rotate;
investigating the pulse width of a square-wave pulse voltage that is generated in a coil of the brushless motor when switching the excitation pattern;
determining the stop position of the rotor from the minimum value thereof;
outputting an excitation pattern having a phase lag of 120 degrees from the rotor stop position during forward rotation; and
outputting an excitation pattern having a phase lead of 120 degrees from the rotor stop position during reverse rotation.

11. A method of starting a brushless motor, comprising:
detecting the stop position of a rotor of the brushless motor by utilizing the inductance of a coil;
stopping energization of all the phases after outputting an excitation pattern with a phase lag of 120 degrees from the stop position of the rotor for a prescribed time;
performing energization control based on a detected rotor position when rotor position detection by induced voltage is possible in the state of energization of all phases being stopped; and
energizing with an excitation pattern so as to stop rotation of the rotor when rotor position detection by induced voltage is impossible in the state of energization of all phases being stopped;
wherein the rotor stop position is detected by utilizing the inductance of the coil after energizing with an excitation pattern for a predetermined time so as to stop rotation of the rotor.

12. A driving device for a brushless motor comprising:
an energization pattern determining device that, during start-up of the brushless motor, energizes the brushless motor with an excitation pattern in accordance with a stop position of a rotor of the brushless motor for an initial energization time and then stops the energization to cause the rotor of the brushless motor to coast;
an excitation switch timing calculating device that determines an excitation timing by detecting the rotor position from an induced voltage that is generated at the motor terminals during coasting of the rotor;
an excitation voltage output device that selects a plurality of excitation patterns that are capable of driving the brushless motor and energize with each excitation pattern in turn within a time range in which the rotor does not rotate;
a pulse voltage width detecting device that detects the pulse widths of a pulse voltage generated in a coil of the brushless motor when the excitation patterns are switched; and
a rotor position estimating device that obtains the minimum value or the maximum value from the pulse widths of each of the pulse voltages in the plurality of excitation patterns and determines the stop position of the rotor from the excitation pattern of the minimum value or maximum value,
wherein the driving device is constituted so as to output an energization pattern that leads or lags by a predetermined electrical angle from the stop position of the rotor determined by the rotor position estimating device as a start-up excitation pattern.

13. The driving device according to claim 12, wherein the pulse voltage is a square-wave pulse voltage.

14. A driving device for a brushless motor, comprising:
an energization pattern determining device that, during start-up of the brushless motor, energizes the brushless motor with an excitation pattern in accordance with a stop position of a rotor of the brushless motor for an initial energization time and then stops the energization to cause the rotor of the brushless motor to coast;
an excitation switch timing calculating device that determines an excitation timing by detecting the rotor position from an induced voltage that is generated at the motor terminals during coasting of the rotor;
an excitation voltage output device that selects a plurality of excitation patterns that are capable of driving the brushless motor and energize with each excitation pattern in turn within a time range in which the rotor does not rotate;

a square-wave pulse voltage width detecting device that detects the pulse widths of a square-wave pulse voltage generated in a coil of the brushless motor when the excitation patterns are switched; and a rotor position estimating device that obtains the minimum value or the maximum value from the pulse widths of each of the square-wave pulse voltages in the plurality of excitation patterns and determines the stop position of the rotor from the excitation pattern of the minimum value or maximum value;

wherein the driving device is constituted so as to output an energization pattern that leads or lags by a predetermined electrical angle from the stop position of the rotor determined by the rotor position estimating device as a start-up excitation pattern.

15. The driving device for a brushless motor according to claim 14, wherein the initial energization time is of a length that is not longer than the time until a first energization switch timing after the rotor starts rotation.

16. The driving device for a brushless motor according to claim 14, wherein the excitation switch timing calculating device calculates the excitation timing from a time interval between the second and subsequent induced voltage signals generated at the motor terminals during coasting of the rotor.

* * * * *